United States Patent
Canavor et al.

(10) Patent No.: US 10,798,545 B2
(45) Date of Patent: Oct. 6, 2020

(54) TECHNIQUES FOR DEVICE DISCOVERY AND CONFIGURATION

(71) Applicant: Amazon Technologies, Inc., Seattle, WA (US)

(72) Inventors: Darren Ernest Canavor, Redmond, WA (US); Srikanth Mantha, Seattle, WA (US)

(73) Assignee: Amazon Technologies, Inc., Seattle, WA (US)

(*) Notice: Subject to any disclaimer, the term of this patent is extended or adjusted under 35 U.S.C. 154(b) by 90 days.

(21) Appl. No.: 15/448,527

(22) Filed: Mar. 2, 2017

(65) Prior Publication Data

US 2018/0255419 A1 Sep. 6, 2018

(51) Int. Cl.
*H04W 4/50* (2018.01)
*H04L 29/06* (2006.01)
(Continued)

(52) U.S. Cl.
CPC ............ *H04W 4/50* (2018.02); *H04L 63/083* (2013.01); *H04L 63/107* (2013.01); *H04W 12/003* (2019.01); *H04W 12/06* (2013.01); *H04W 12/08* (2013.01); *H04W 4/02* (2013.01); *H04W 4/80* (2018.02)

(58) Field of Classification Search
CPC ........ H04W 4/50; H04W 4/80; H04W 12/06; H04W 12/08; H04W 4/02; H04L 63/083; H04L 63/107

See application file for complete search history.

(56) References Cited

U.S. PATENT DOCUMENTS 9,774,571 B2 * 9/2017 Krantz .................. G06Q 10/10
9,917,619 B2 * 3/2018 Turner ................. H04B 5/0031
(Continued)

FOREIGN PATENT DOCUMENTS

WO 2015038956 A1 3/2015

OTHER PUBLICATIONS

PCT/US2018/018219 , "International Search Report and Written Opinion", dated Apr. 18, 2018, 12 pages.
(Continued)

*Primary Examiner* — Eleni A Shiferman
*Assistant Examiner* — Bassam A Noaman
(74) *Attorney, Agent, or Firm* — Kilpatrick Townsend & Stockton LLP

(57) ABSTRACT

Systems and methods are provided herein for configuring a device. In some embodiments, a device identifier associated with a target device is received from a service provider computer. A connection request comprising the device identifier is received. In response to receiving the connection request, the target device is configured to connect to a network access point. A request for configuration information associated with the target device may be requested. In some examples, the configuration information comprises authentication information associated with a user account. In response to receiving the configuration information, the configuration information may be transmitted to the target device. The transmission of the configuration information may cause the target device to be configured to exchange data with the service provider computer.

16 Claims, 10 Drawing Sheets

(51) Int. Cl.
*H04W 12/06* (2009.01)
*H04W 12/08* (2009.01)
*H04W 12/00* (2009.01)
H04W 4/02 (2018.01)
H04W 4/80 (2018.01)

(56) References Cited

U.S. PATENT DOCUMENTS

| | | |
|---|---|---|
| 2014/0181521 A1 | 6/2014 | Hemphill et al. |
| 2015/0081837 A1* | 3/2015 | Bernier .................. H04W 8/24 709/217 |
| 2015/0128128 A1* | 5/2015 | McCurdy ............ G06F 9/44505 717/177 |
| 2016/0014601 A1* | 1/2016 | Mellqvist .............. H04W 12/06 455/411 |
| 2017/0048700 A1 | 2/2017 | Huang et al. |
| 2018/0109993 A1* | 4/2018 | Kwan ................... H04W 48/14 |
| 2019/0090116 A1* | 3/2019 | Zarakas ............. G06Q 20/3672 |

OTHER PUBLICATIONS

PCT/US2018/018219, "International Preliminary Report on Patentability", dated Sep. 12, 2019, 8 pages.

\* cited by examiner

TECHNIQUES FOR DEVICE DISCOVERY AND CONFIGURATION

BACKGROUND

Consumers often purchase devices that require some form of configuration in order to interact with other devices and/or systems. By way of example, some devices may require the user to provide information (e.g., a network identifier, network credentials, etc.) to configure wireless access to a network access point. As another example, a user may be required to provide information (e.g., credentials, file paths, client applications, etc.) to enable access to data and/or systems required to perform various device functions. Conventional techniques require numerous interactions with the device user in order to obtain such information, such as requiring the user to input various pieces of information with step-by-step prompting, otherwise known as a "setup wizard." This may cause delay in the configuration process. Additionally, conventional techniques provide opportunities for human error. As a result, the device may not be appropriately configured to provide the desired functionality. Conventional techniques also provide challenges for differently-abled individuals to successfully configure their devices as current configuration interactions with the user are typically visually provided. Current techniques provide significant drawbacks with respect to latency and accuracy of the configuration process.

BRIEF DESCRIPTION OF THE DRAWINGS

Various embodiments in accordance with the present disclosure will be described with reference to the drawings, in which.

DETAILED DESCRIPTION

Figure 1:
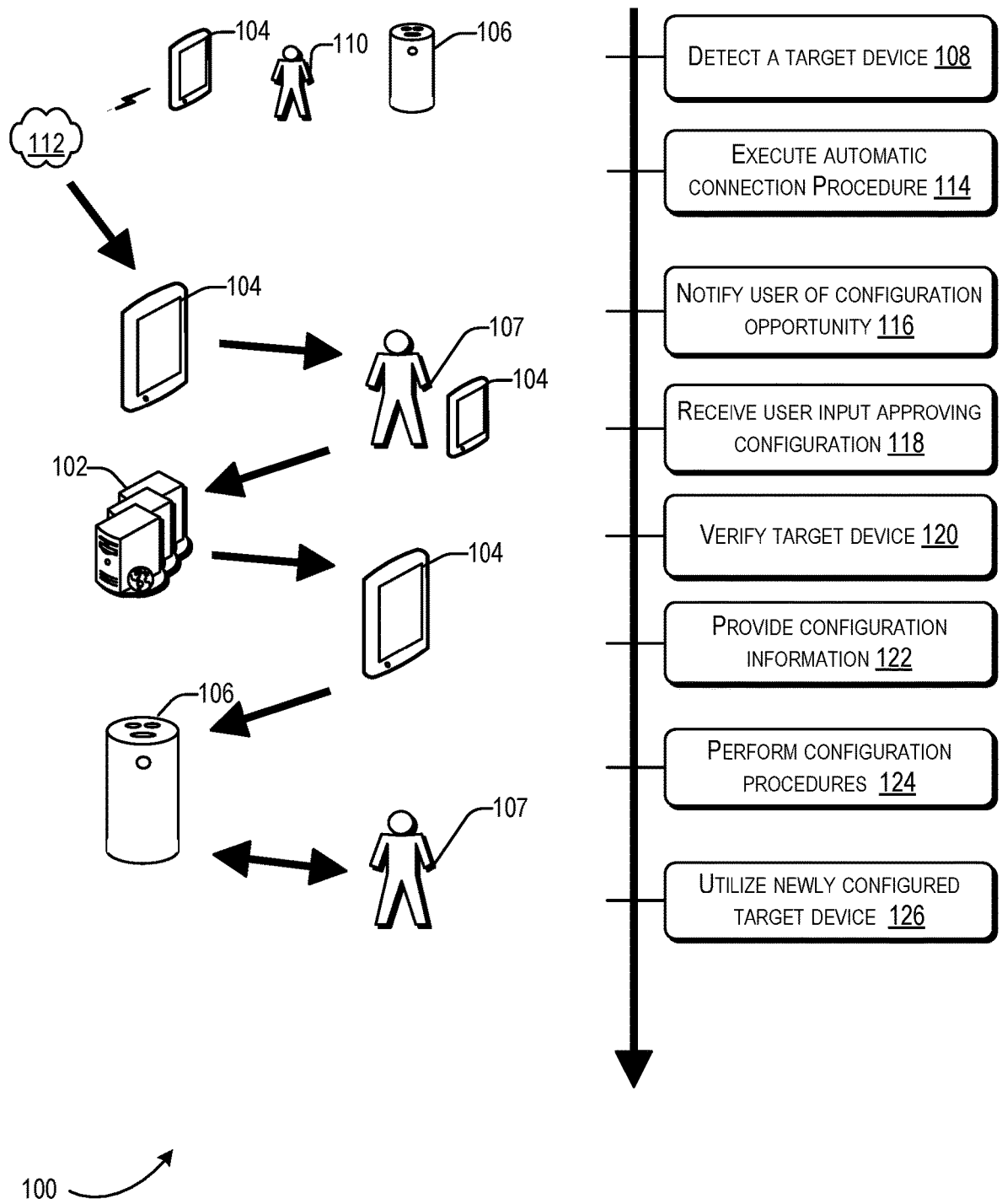
FIG. 1 illustrates an example flow for describing techniques for configuring a device as described herein, according to at least one embodiment.

Techniques described herein are directed to automatically configuring a device. In at least one embodiment, a user may navigate to a website utilizing a device (herein referred to as an "intermediary device") that is already configured to access a network (e.g., the Internet) and/or a user account (e.g., a user account profile associated with an electronic marketplace). The user may procure (e.g., purchase, lease, etc.) another device (herein referred to as "the target device") using conventional techniques. Prior to delivery of the target device to the user (e.g., during a fulfillment process), or at another suitable time, information may be stored on the target device, such as a pairing code to be used to connect the target device to another device (e.g., the intermediary device) using a short-range wireless protocol (e.g., Bluetooth). When the user powers on the target device, the user may be prompted (e.g., visually and/or verbally) to approve the execution of a configuration process. In some cases, a user preference indicating that the user approves automatic configuration may be stored or accessible to the intermediary device. If the execution of the configuration process is approved, a number of configuration workflows may be performed to configure the target device without requiring further user interaction. In the examples provided throughout, it should be appreciated that the website or provider of the item to be configured could also manage an electronic marketplace.

In some embodiments, prior to the execution of the configuration workflows, the target device, the intermediary device, a routing device (e.g., a router, a gateway, etc.), or any suitable device involved in the configuration process may be verified. For example, the intermediary device and/or the router may request verification from a service provider that manages a user account on behalf of the user. The intermediary device and/or router may verify the target device using locally stored identification information (e.g., MAC ID, device identifier, serial number, etc.). In still further examples, the intermediary device and/or the router may provide self-identification information (e.g., MAC ID, device identifier, serial number, etc.) to the target device to enable the target device to verify the intermediary device and/or the routing device against locally stored information. In still further examples, the identification information for any device may be provided by a service provider rather than the device itself. Thus, utilizing the techniques discussed herein, two-way verification is enabled between any two devices.

As part of a process for verifying the identity/authenticity of the target device, a geographic location of the target device may be utilized. For example, the geographic location of the target device may be compared to a known location associated with the user (e.g., a work address, a home address, a shipping address, etc.). If the geographic location of the target device is within a threshold distance of the known location, the verifying entity (e.g., the service provider, the intermediary device, the routing device, etc.) may send a verification response that indicates that the target device is verified.

In some embodiments, the verification process may include determining other devices that are detected by the target device. For example, the target device may detect other user devices in a home (e.g., a laptop, a smart T.V., a routing device, a cellphone, etc.). Upon requesting a connection, or at another suitable time, the detected device may be compared to devices that are associated with the user and/or the location. By way of example, a user account may contain an association between the user and a laptop. If the target device provides the identity of the laptop, such information may be utilized to verify that the target device is authentic and that it is at an expected location (e.g., the user's home).

In some examples, any combination of verification information (e.g., geographic location, detected devices, MAC ID, other device identifier, etc.) may be utilized to determine a confidence value that indicates a likelihood that the target device is the expected device and that it is operating at the expected location. If the confidence value is greater than or equal to a threshold value, then the verifying entity may consider the target device verified. The verifying entity may consider the target device unverifiable if the confidence value is less than the threshold value. By utilizing such techniques, fraudulent transactions may be reduced it would be far more difficult for unauthorized users to provide the environment within which a target device could be verified. Thus, although a device might be stolen, it could not be configured unless verification was successful.

Once verification has occurred, the intermediary device and/or a routing device may be used to provide configuration information to the target device. As a non-limiting example, the intermediary and/or routing device may provide locally and/or remotely-stored configuration data such as a username, a password, a cryptographic key, a public/private key pair, a datagram, a shared secret, network access point authentication information (e.g., a network identifier and/or a network password, also referred to as network access information), a location of access (e.g., a web address, a filename, a file path, etc.), a software application, a data file, or any suitable information for configuring the target device to access additional data and/or systems, or to provide any suitable device functionality.

For example, the intermediary and/or routing device may store network access information (e.g., a network identifier and a network password) for communicating with a network access point (e.g., a routing device). In some embodiments, the intermediary and/or routing device may be configured to store user account authentication information (e.g., a username and a password) that may be utilized to access a user account. Accordingly, the intermediary and/or routing device may be configured to provide configuration information (e.g., the network access information and/or the user account authentication information) to the target device in response to receiving an indication that the configuration process was approved.

In at least one embodiment, the target device may be configured to utilize the configuration data to execute connection procedure instructions to connect to a network access point and/or to the user account. In at least one embodiment, once connected to the user account, the target device may request and/or receive additional data (e.g., additional configuration data, one or more software applications, etc.) required to enable various device functionality. The target device may receive the additional data (e.g., from a server, from the intermediary device, etc.) and may utilize the additional data to configure the target device for use.

As another non-limiting example, a server may provide identifying information (e.g., a media access control (MAC) identifier (ID), a serial number, etc.) of the target device to an intermediary device (e.g., a router, a smartphone, a laptop, etc.). Upon receipt of the information, the intermediary device (e.g., a router) may be configured to store the information locally. By way of example, a MAC ID may be provided to a user's router and stored as part of the router's whitelist. The router's whitelist may allow connection to occur only with devices that are identified on the whitelist.

Separately, as part of the fulfillment process, data (e.g., a network identifier or MAC ID of a network access point such as the user's home router, a MAC ID of another device associated with the user, etc.) may be loaded into local memory of the target device. Upon being powered on, the target device may be configured to scan for available networks and/or. If the target device detects a network and/or another device, then the target device may be configured to attempt connection with the detected network/device. Upon receiving a request for connection, the other device (e.g., an intermediary device such as a router, a smartphone, a laptop, etc.) may be configured to provide identifying information (e.g., the router's MAC ID, a network name, the MAC ID of the intermediary device, etc.). The target device may be configured to verify if the identifying information matches the data stored in local memory (e.g., a MAC ID of an expected device). If the information matches, the target device may be configured to provide its own identifying information (e.g., the MAC ID, or other unique identifier of the new device) to the intermediary device (e.g., the router, the smartphone, etc.). The intermediary device may be configured to check if the provided identifying information matches information stored in local memory (e.g., a MAC ID identified in a whitelist of a router, a MAC ID stored in local memory, etc.), and if so, the target device may be allowed to connect to the intermediary device.

A network access device and/or a separate intermediary device may be utilized to configure and/or provide configuration information to the target device. In the examples above, the exchange of MAC ID (or other device identifier) between the target device and the intermediary device(s) (e.g., a network access device, a smartphone, a laptop, etc.) may occur in any suitable order. Thus, the target device may first provide its device identifier to the intermediary device for verification, or the intermediary device may first provide its device identifier to the target device. In some examples, one-way verification may be sufficient to enable connection and/or configuration information transfer, while in other embodiments, two-way verification may be required. One-way verification is intended to refer to scenarios in which one device verifies the identity of another device, whereas two-way verification is intended to refer to scenarios in which both devices verify the identity of each other.

The techniques disclosed herein provide, at least, an efficient and secure method of providing configuration information to a target device that at least reduces the need for user interaction. That is, users that receive new devices may no longer be burdened with a lengthy configuration process. Utilizing the techniques discussed herein improve both latency and accuracy of the configuration process. Additionally, such techniques may reduce the ability for stolen devices to be utilized by unauthorized users.

The techniques described above and below may be implemented in a number of ways and in a number of contexts. Several example implementations and contexts are provided with reference to the following figures, as described below in more detail. However, the following implementations and contexts are but a few of many.

FIG. 1 illustrates an example flow 100 for describing techniques for configuring a device as described herein, according to at least one embodiment. In the flow 100, operations may be performed by one or more processors of one or more service provider computers (e.g., the service provider computer(s) 102), one or more intermediary devices (e.g., the intermediary device 104), and/or one or more target devices (e.g., the target device 106), and/or instructions for performing the operations may be stored in one or memories of any of the devices 102-106. As desired, the flow 100 may begin at 108, where the target device 106 may be detected (e.g., by the intermediary device 104). The target device 106 may have been, in some examples, previously procured (e.g., purchased, leased, borrowed, rented, etc.) by a user 110 (e.g., from an electronic marketplace hosted by the service provider computer(s) 102). Although the target device 106 of FIG. 1 is depicted as a voice-controlled device used for playing music or controlling other devices, the target device 106 may be any type of device such as, but not limited to, a mobile handheld device, a desktop computer, a notebook computer, an electronic book reader, a tablet computing device, a smartphone, etc.

The procurement of the target device 106 may occur in numerous ways. By way of example, the service provider computer(s) 102 may host network content (e.g., a web page of the electronic marketplace, or the like) accessible by the intermediary device 104 via the network 112. In some examples, the network 112 may include any one or a combination of many different types of networks, such as cable networks, the Internet, wireless networks, cellular networks, and other private and/or public networks. The intermediary device 104 may be configured to display the network content to the user 110. In such examples, the user 110 may utilize a user interface (UI) of the network content in order to procure the target device 106. In some examples, as part of a procurement and/or fulfillment process, both the target device 106 and the intermediary device 104 may be configured to store a Bluetooth pairing code to enable the execution of an automatic connection procedure between the two devices. At any suitable time, the user 110 may power on the target device 106. The target device 106 may be detected at 108 by the intermediary device 104 (e.g., a smartphone operated by the user 110) via, for example, a short-range wireless interconnection such as Bluetooth®. An automatic connection procedure may be executed at 114 utilizing, for example, the stored Bluetooth pairing code. Upon execution of the automatic connection procedure at 114, the target device 106 and the intermediary device 104 may be configured to exchange information using the short-range wireless interconnection.

In at least one embodiment, the user 110 may be notified of a configuration opportunity at 116. Such notification can take various forms. For example, upon successful connection to the target device 106, the intermediary device 104 may be configured to provide a push notification, audible and/or visual alert, email, or any suitable form of electronic notification. Additionally, or alternatively, the target device 106 may be configured to provide one or more of the notifications listed above. In some examples, the notification may indicate to the user 110 that an option to configure the target device 106 is available. The user 110 may be enabled to provide input (e.g., voice command, textual input, button selection, etc.) to indicate an approval to configure the target device 106. In some cases, the configuration option provided may indicate that the target device 106 is to be configured with configuration information provided by the intermediary device 104 (e.g., configuration information locally stored by the intermediary device 104 and/or configuration information obtained by the intermediary device 104 from a remote source such as the service provider computer(s) 102). It should be appreciated that, in some cases, a user preference indicating that the user approves automatic configuration may be stored or accessible to the intermediary device 104. In such cases, a notification may not be provided on the target device 106 or the intermediary device 104 prior to commencement of a verification and/or configuration process.

In some examples, the intermediary device 104 may have previously been configured to store user account credentials to access a user account maintained by the service provider computer(s) 102. Such user account credentials may be associated with a software application running on the intermediary device 104 that is configured to exchange information with the service provider computer(s) 102. Upon receiving the user input at 118, the intermediary device 104 may be configured to verify the identity of the target device 106 (e.g., from locally stored information such as a MAC ID, user account history, etc.) and/or request verification of the target device 106 by a remote system (e.g., the service provider computer(s) 102). By way of example, the intermediary device 104 may transmit a verification request to the service provider computer(s) 102 to verify the target device 106 at 120. The verification request may include the user credentials and a device identifier (e.g., a MAC ID) of the target device 106. The service provider computer(s) 102 may be associated with an entity from which the user 110 procured the target device 106. In at least one example, the verification request may cause the service provider computer(s) 102 to consult user account history (e.g., order history, shipping information, etc.) to verify that a transaction involving a device with a matching device identifier (e.g., MAC ID) occurred.

In at least one example, the verification request may additionally include a geographic location corresponding to the location of the target device. Additionally, or alternatively, the verification request may include other devices that are detected by the target device and/or the intermediary device. The service provider computer(s) 102 may utilize the geographic location of the target device to verify the target device. Any suitable combination of the information provided in the verification request (e.g., geographic location, detected devices, MAC ID, other device identifier, etc.) may be utilized to determine a confidence value that indicates a likelihood that the target device is an expected device and that it is operating at an expected location. If the confidence value equals or exceeds a threshold value, then service provider computer(s) 102 may provide a verification response indicating that the target device has been verified.

In some embodiments, during a fulfillment process to provide/deliver the target device 106, the intermediary device 104 may receive a device identifier (e.g., a MAC ID) of the target device 106. The intermediary device 104 may store the device identifier in local memory and utilize such information to verify the target device 106 at 120 instead of requesting verification of the target device 106 from the service provider computer(s) 102. The intermediary device 104 may further store location information and/or other device identifiers to be utilized to verify the target device 106. For example, a location and/or one or more other device identifiers may be stored in local memory and utilized by the intermediary device 104 to verify the target device 106. In some cases, the intermediary device 104 may compute a confidence score for the target device 106 utilizing received information (e.g., a location of the target device, device identifiers detected by the target device, etc.). If the confidence score meets or exceeds a threshold value, the intermediary device 104 may determine that the target device 106 is verified.

The intermediary device 104, upon verifying the identity of the target device 106, may provide configuration information to the target device 106 at 122. Configuration information may include a network identifier, a network password, user account credentials (e.g., username and/or password), software applications, firmware updates, software updates, or any suitable configuration information required by the target device 106 to perform device functionality. In some cases, configuration information may be identified from the user account maintained by the service provider computer(s) 102. Additionally, or alternatively, configuration information may be identified by the intermediary device 104 from configuration information required for the intermediary device 104 to perform device functionality. In at least one example, the configuration information may be partially or completely stored in local memory on the intermediary device 104. In some examples, the configuration information may be partially or completely stored at a remote location (e.g., at a storage location accessible to the service provider computer(s) 102).

Providing the configuration information at 122 may occur in a variety of ways. As a non-limiting example, the intermediary device 122 may provide at least a portion of the configuration information to the target device 106 utilizing a Bluetooth interconnection. By way of example, a network identifier and a network password may be provided to the target device 106 via Bluetooth to enable the target device 106 to connect to a network access point. Similarly, a user credentials may be provided to the target device 106 via Bluetooth to enable the target device 106 to connect to a user account maintained by the service provider computer(s) 102. Upon receipt of the configuration information, the target device 106 may be configured to perform configuration procedures at 124.

In at least one embodiment, configuration procedures may include storing and/or installing the configuration information in local memory at the target device 106. Configuration procedures may further include utilizing a portion of the configuration information (e.g., a network identifier and network password) to connect to a network access device (e.g., a home router). Configuration procedures may further include utilizing user account credentials (e.g., username and password) to access a user account via the network 112. The user account may be one that is maintained by the service provider computer(s) 102. Configuration procedures may further include triggering one or more software application downloads, firmware updates, software updates, etc. By way of example, upon connecting to the user account via the network 112, a software application may be downloaded and installed on the target device 106. The software application, in some examples, may be utilized by the target device 106 for future interactions with the service provider computer(s) 102. Upon completion of the configuration procedures, the user 107 may utilize the newly configured target device 106 at 126.

Figure 2:
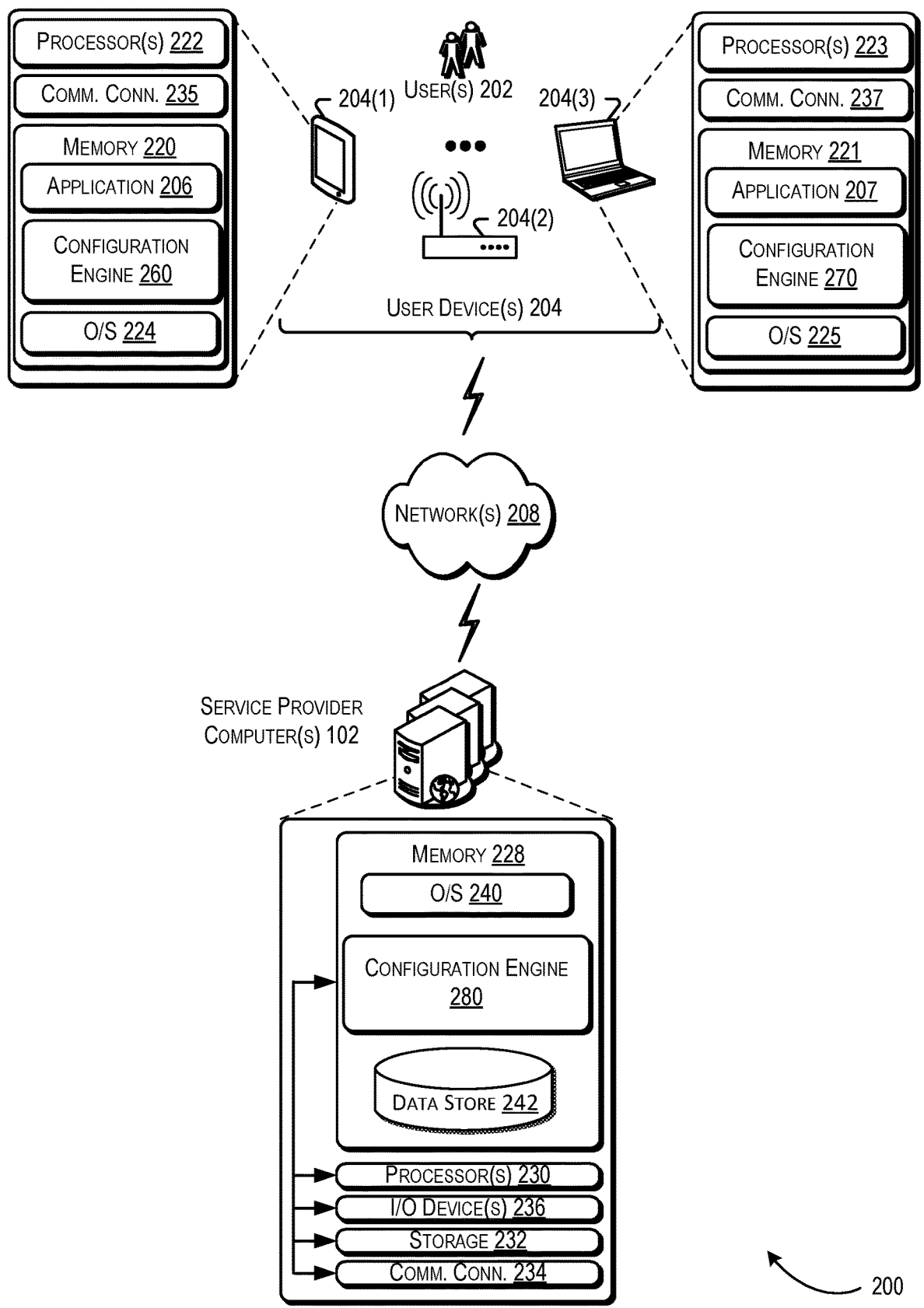
FIG. 2 is an example system architecture of a configuration engine, in accordance with at least one embodiment.

FIG. 2 is an example system architecture 200 of a configuration engine (e.g., a configuration engine 260, a configuration engine 270, and/or a configuration engine 280), in accordance with at least one embodiment. In architecture 200, one or more users 202 may utilize a user device (e.g., a user device of a collection of the user devices 204) to navigate to a network page provided by the service provider computer(s) 102. For example, the user may access a user interface accessible through an application 206 running on the user device 204(1) (e.g., the intermediary device 104 of FIG. 1) via one or more networks 208. In some aspects, the application 206 operating on the user device 204(1) may be hosted, managed, and/or provided by a computing resources service or service provider, such as by utilizing one or more service provider computer(s) 102. The user device 204(1) (e.g., a smartphone) and/or the user device 204(2) (e.g., a router) may be considered examples of an intermediary device (e.g., the intermediary device 104 of FIG. 1) that is configured to perform configuration procedures related to the user device 204(3) (e.g., the target device 106 of FIG. 1).

In some examples, the networks 208 may include any one or a combination of many different types of networks, such as cable networks, the Internet, wireless networks, cellular networks, and other private and/or public networks. While the illustrated example represents the users 202, accessing application functionality over the networks 208, the described techniques may equally apply in instances where the users 202 interact with the service provider computer(s) 102 via the one or more user devices 204 over a landline phone, via a kiosk, or in any other suitable manner. It should be appreciated that the described techniques may apply in other client/server arrangements, as well as in non-client/server arrangements (e.g., locally stored applications, etc.).

As described briefly above, the application 206 may allow the users 202 to interact with the service provider computer(s) 102 so as to request a user device 204(3) (e.g., the target device 106) and/or to obtain configuration information associated with a user account and/or the user device 204(3). For example, a user may purchase the user device 204(3) utilizing the user device 204(1) from a website hosted by the service provider computer(s) 102. In at least one example, the application 206 may utilize user credentials of the users 202 to access a user account maintained by the service provider computer(s) 102. Configuration information associated with the user device 204(3) and/or the user account may be stored in a storage location accessible to the service provider computer(s) 102 (e.g., within the user account, as an association to the user account, etc.).

The service provider computer(s) 102, perhaps arranged in a cluster of servers or as a server farm, may host the application 206 and/or the application 207 operating on the user device 204(1) and user device 204(3), respectively, and/or cloud-based software services. Other server architectures may also be used to host the application 206, the application 207, and/or cloud-based software services. The application 206 operating on the user device 204(1) may be capable of handling requests from the users 202 and serving, in response, various user interfaces that can be rendered at the user device 204(1). The application 206 operating on the user device 204(1) can present any suitable type of website that supports user interaction, including search engine sites. The described techniques can similarly be implemented outside of the application 206, such as with other applications running on the user device 204(1). The application 207, operating on the user device 204(3) may have similar capabilities with respect to the user device 204(3)

The user device 204 may be any suitable type of computing device such as, but not limited to, a mobile phone, a hand-held scanner, a touch screen device, a vocally-commanded device, a smartphone, a personal digital assistant (PDA), a laptop computer, a desktop computer, a thin-client device, a tablet PC, an electronic book (e-book) reader, etc. In some examples, the user devices 204 may be in communication with the service provider computer(s) 102 via the networks 208, or via other network connections.

In one illustrative configuration, the user device 204(1) may include at least one memory 220 and one or more processing units (or processor(s)) 222. The processor(s) 222 may be implemented as appropriate in hardware, computer-executable instructions, firmware, or combinations thereof. Computer-executable instruction or firmware implementations of the processor(s) 222 may include computer-executable or machine-executable instructions written in any suitable programming language to perform the various functions described. Similarly, the user device 204(3) may include at least one memory 221 and one or more processing units (or processor(s)) 223. The processor(s) 223 may be implemented as appropriate in hardware, computer-executable instructions, firmware, or combinations thereof. Computer-executable instruction or firmware implementations of the processor(s) 223 may include computer-executable or machine-executable instructions written in any suitable programming language to perform the various functions described.

The memory 220 and the memory 221 may individually store program instructions that are loadable and executable on the processor(s) 222 and the processor(s) 223, respectively, as well as data generated during the execution of these programs. Depending on the configuration and type of user computing device, the memory 220 and/or the memory 221 may be volatile (such as random access memory (RAM)) and/or non-volatile (such as read-only memory (ROM), flash memory, etc.). The user devices 204 may also include additional removable storage and/or non-removable storage including, but not limited to, magnetic storage, optical disks, and/or tape storage. The disk drives and their associated computer-readable media may provide non-volatile storage of computer-readable instructions, data structures, program modules, and other data for the computing devices. In some implementations, the memory 220 and/or the memory 221 may include multiple different types of memory, such as static random access memory (SRAM), dynamic random access memory (DRAM), or ROM. In at least some examples, configuration information (e.g., a network identifier, a network password, user credentials, software applications, firmware updates, software updates, etc.) may be stored in the memory 220, the memory 221, and/or the memory 228 of the service provider computer(s) 102.

Turning to the contents of the memory 220 in more detail, the memory 220 may include an operating system 224 and one or more application programs, modules, or services for implementing the features disclosed herein, such as via the application 206 (e.g., a browser application). The application 206 may be configured to receive, store, and/or display a network page or other interface for interacting with the service provider computer(s) 102. Additionally, the memory 220 may store configuration information and/or other user information such as, but not limited to, network identifiers, network passwords, user IDs, passwords, and/or other user information. In some examples, the configuration information may include information for authenticating account access such as, but not limited to, a device ID, a cookie, an IP address, a location, or the like.

Turning to the contents of the memory 221 in more detail, the memory 221 may include an operating system 225 and one or more application programs, modules, or services for implementing the features disclosed herein, such as via the application 207 (e.g., a music application, a browser application, etc.). The application 207 may be configured to receive, store, and/or display a network page or other interface for interacting with the service provider computer(s) 102. Additionally, the memory 221 may store configuration information and/or other user information such as, but not limited to, network identifiers, network passwords, user IDs, passwords, and/or other user information. In some examples, the configuration information may include information for authenticating account access such as, but not limited to, a device ID, a cookie, an IP address, a location, or the like.

Although not depicted, the user device 204(2) (e.g., a routing device) may be configured with one or more processors, one or more memories, one or more applications, one or more operating systems, etc. similar to the configuration of the user device 204(1) and/or the user device 204(3). The user device 204(2) may also be any suitable type of computing devices such as, but not limited to, a mobile phone, a smart phone, a personal digital assistant (PDA), a laptop computer, a network access point, a desktop computer, a server computer, a thin-client device, a tablet PC, etc. Additionally the user device 204(2) may store a whitelist in memory. A whitelist, as used herein, is intended to refer to a list of device identifiers for which connection is allowed.

The user devices 204 may also contain communication connections (e.g., communication connection(s) 235 and communication connection(s) 237) that allow the user devices 204 to communicate with a stored database, another computing device or server, user terminals and/or other devices on the networks 208. Such communication connections may enable the user devices 204 to communicate via the networks 208 and/or the communication connections may enable the user devices 204 to communicate via a short-range communications protocol (e.g., Bluetooth).

Turning to the contents of the memory 220 and the memory 221 in more detail, the memory 220 and the memory 221 may include an operating system 224 and an operating system 225, respectively. The memory 220 may further include, one or more data stores (not depicted), and/or one or more application programs, modules, or services for implementing the features disclosed herein, such as the features provided by the configuration engine 260. The memory 221 may further include, one or more data stores (not depicted), and/or one or more application programs, modules, or services for implementing the features disclosed herein, such as the features provided by the configuration engine 270.

In some aspects, the service provider computer(s) 102 may also be any suitable type of computing devices such as, but not limited to, a mobile phone, a smart phone, a personal digital assistant (PDA), a laptop computer, a desktop computer, a server computer, a thin-client device, a tablet PC, etc. Additionally, it should be noted that in some embodiments, the service provider computer(s) 102 are executed by one more virtual machines implemented in a hosted computing environment. The hosted computing environment may include one or more rapidly provisioned and released computing resources, which computing resources may include computing, networking and/or storage devices. A hosted computing environment may also be referred to as a cloud-computing environment. In some examples, the service provider computer(s) 102 may be in communication with the user devices 204(1), the user device 204(2), the user device 204(3) and/or other service providers via the networks 208 or via other network connections. The service provider computer(s) 102 may include one or more servers, perhaps arranged in a cluster, as a server farm, or as individual servers not associated with one another. These servers may be configured to implement the functionality described herein as part of an integrated, distributed computing environment.

In one illustrative configuration, the service provider computer(s) 102 may include at least one memory 228 and one or more processing units (or processor(s)) 230. The processor(s) 230 may be implemented as appropriate in hardware, computer-executable instructions, firmware, or combinations thereof. Computer-executable instruction or firmware implementations of the processor(s) 230 may include computer-executable or machine-executable instructions written in any suitable programming language to perform the various functions described.

The memory 228 may store program instructions that are loadable and executable on the processor(s) 230, as well as data generated during the execution of these programs. Depending on the configuration and type of service provider computer(s) 102, the memory 228 may be volatile (such as RAM) and/or non-volatile (such as ROM, flash memory, etc.). The service provider computer(s) 102 or servers may also include additional storage 232, which may include removable storage and/or non-removable storage. The additional storage 232 may include, but is not limited to, magnetic storage, optical disks and/or tape storage. The disk drives and their associated computer-readable media may provide non-volatile storage of computer-readable instructions, data structures, program modules, and other data for the computing devices. In some implementations, the memory 228 may include multiple different types of memory, such as SRAM, DRAM, or ROM.

The memory 228, the additional storage 232, both removable and non-removable, are all examples of computer-readable storage media. For example, computer-readable storage media may include volatile or non-volatile, removable or non-removable media implemented in any method or technology for storage of information such as computer-readable instructions, data structures, program modules, or other data. The memory 228 and the additional storage 232 are all examples of computer storage media. Additional types of computer storage media that may be present in the service provider computer(s) 102 may include, but are not limited to, PRAM, SRAM, DRAM, RAM, ROM, EEPROM, flash memory or other memory technology, CD-ROM, DVD or other optical storage, magnetic cassettes, magnetic tape, magnetic disk storage or other magnetic storage devices, or any other medium which can be used to store the desired information and which can be accessed by the service provider computer(s) 102. Combinations of any of the above should also be included within the scope of computer-readable media.

Alternatively, computer-readable communication media may include computer-readable instructions, program modules, or other data transmitted within a data signal, such as a carrier wave, or other transmission. However, as used herein, computer-readable storage media does not include computer-readable communication media.

The service provider computer(s) 102 may also contain communications connection(s) 234 that allow the service provider computer(s) 102 to communicate with a stored database, another computing device or server, user terminals and/or other devices on the networks 208. The service provider computer(s) 102 may also include I/O device(s) 236, such as a keyboard, a mouse, a pen, a voice input device, a touch input device, a display, speakers, a printer, etc.

Turning to the contents of the memory 228 in more detail, the memory 228 may include an operating system 240, one or more data stores 242, and/or one or more application programs, modules, or services for implementing the features disclosed herein, such as the features provided by the configuration engine 280.

Figure 3:
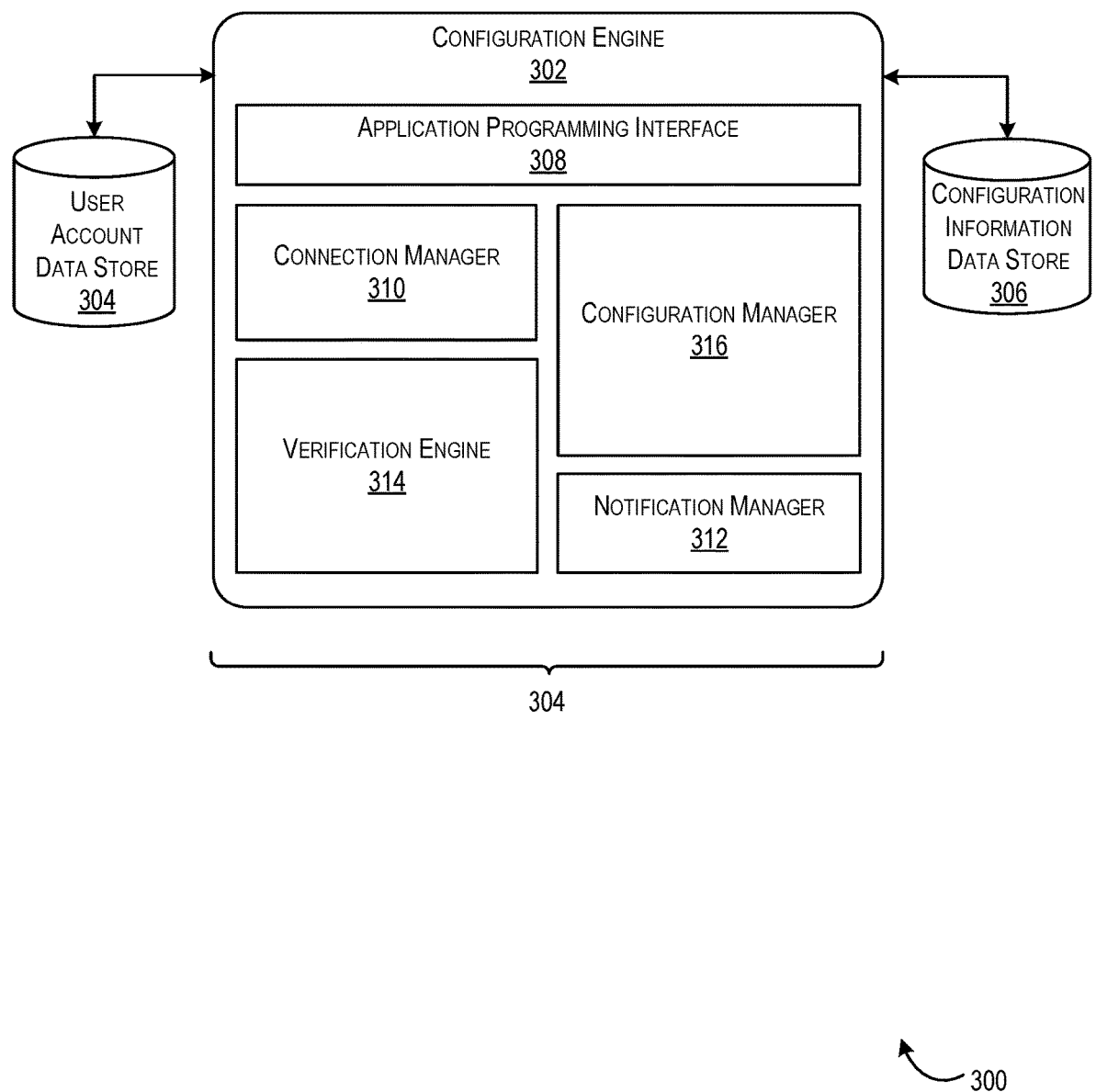
FIG. 3 is an example computer architecture of a configuration engine, in accordance with at least one embodiment.

FIG. 3 is an example computer architecture of a configuration engine 302 (e.g., the configuration engine 260, the configuration engine 270 and/or the configuration engine 280 of FIG. 2), in accordance with at least one embodiment. In accordance with at least one embodiment, the configuration engine 302 may include a plurality of modules that may carry out various embodiments. The modules may be software modules, hardware modules, or a combination thereof. If the modules are software modules, the modules can be embodied on a computer readable medium and processed by a processor in any of the computer systems described herein. It should be noted that any module or data store described herein, might be, in some embodiments, a service responsible for managing data of the type required to make corresponding calculations. The modules may exist as part of the configuration engine 260 operating on the user device 204(1) of FIG. 2 as part of application 206 or separately. The modules may exist as part of a configuration engine operating on the user device 204(2) of FIG. 2 as part of an application running on the user device 204(2) or separately. The modules may exist as part of the configuration engine 270 operating on the user device 204(3) of FIG. 2 as part of application 207 or separately. The modules may exist as part of the configuration engine 280 operating on the service provider computer(s) 102 as part of an application running on the service provider computer(s) 102 or separately. Any combination of modules associated with the configuration engine 302 may be executed, in whole or in part, on the service provider computer(s) 102, the user devices 204(1), 204(2), 204(3), or any suitable combination thereof.

In the embodiment shown in the FIG. 3, a user account data store 304 and a configuration information data store 322 are shown, although data can be maintained, derived, or otherwise accessed from various data stores, either remote or local to the configuration engine 302, to achieve the functions described herein. In at least one embodiment, the data stores described herein may be physically located on the user device(s) 204 of FIG. 2 or alternatively, any suitable combination of the data stores may be operated as part of the service provider computer(s) 102, for example, as part of a configuration engine. The configuration engine 302, as shown in FIG. 3, includes various modules such as an application programming interface 308, a connection manager 310, a notification manager 312, a verification engine 314, and a configuration manager 316. Some functions of the modules 308, 310, 312, 314, and 316 are described below. However, for the benefit of the reader, a brief, non-limiting description of each of the modules is provided in the following paragraphs. In accordance with at least one embodiment, a process is enabled for providing item information with a network page associated with a shopping cart.

In at least one embodiment, the configuration engine 302 includes the application programming interface 308. Generally, the application programming interface 308 may be utilized to receive and/or provide any suitable information to and/or from the configuration engine 302 (or modules of the configuration engine 302) with respect to any example provided herein.

In at least one embodiment, the connection manager 310, a component of configuration engine 302, may be configured to detect a device presence via a wired/wireless network and/or a short-range wireless interconnect. For example, the connection manager 310 may detect a target device (e.g., the target device 106 of FIG. 1) via a Bluetooth communication. In some cases, the connection manager 310 may be operating on a target device. Accordingly, the connection manager 310 may be configured to detect the presence of an intermediary device (e.g., a smartphone such as user device 204(1) and/or a router such as the user device 204(2)). The connection manager 310 may be configured to receive a connection request. In some examples, the connection request may contain a device identifier (e.g., a MAC ID) for the device with which connection is requested. The connection manager 310 may be configured to stimulate the notification manager 312, discussed below, to provide one or more notifications to a user (e.g., via an intermediary device such as intermediary device 104 of FIG. 1, via the target device 106, etc.). The connection manager 310 may be configured to receive a confirmation from the notification manager 312 that a configuration procedure has been approved by a user.

In at least one embodiment, the connection manager 310 may be configured to stimulate the verification engine 314 to perform a number of verification procedures. The connection manager 310 may be configured to transmit a verification request. The verification request may contain one or more device identifiers for which connection is requested, a geographic location identifier associated with the one or more device identifiers, one or more additional device identifiers which are located within a threshold distance of a target device (e.g., detected by the target device), or any suitable combination of the above. The connection manager 310 may be configured to receive a verification response (e.g., from the service provider computer(s) 102 of FIG. 2). The verification response may indicate that the device for which a connection is to be established is verified or is not verified. The connection manager 310 may be configured to conduct a connection procedure to establish a connection (e.g., wired/wireless, short-range wireless) between two devices (e.g., between an intermediary device (e.g., the user device 204(2), the user device 204(1), etc.) and a target device (e.g., user device 204(3))). In some examples, execution of the connection procedure may depend on the content of a verification response. For example, if a verification response indicates that a device identifier is not verified, the connection manager 310 may be configured to reject a connection request or block a connection with a device corresponding to the device identifier. Conversely, if a verification response indicates that a device identifier is verified, the connection manager 310 may be configured to conduct a connection procedure to establish a connection between two devices. In some examples, the connection manager 310 may be operating on one of the two devices or separately from the two devices.

As a non-limiting example, an instance of the connection manager 310 may be executed on both an intermediary device and a target device. In at least one example, the connection manager 310 may be configured to receive a code (e.g., a Bluetooth pairing code). In at least one example, the code may be received (e.g., from the service provider computer(s) 102, from a server computer, etc.) as part of a fulfillment process conducted to provide the target device to the user. In such cases, the connection manager 310 may be configured to store the code in local memory on the receiving device. The connection manager 310 operating on each device may be configured to access the locally stored code in order to enable a connection (e.g., a Bluetooth connection) to be established between the two devices.

In at least one embodiment, the connection manager 310 may be configured to transmit a configuration information request to, for example, the configuration manager 316. The configuration manager 316 may be operating on a same device as the connection manager 310, or the configuration manager 316 may be operating on a separate device. In at least one example, the connection manager 310 may be configured to transmit the configuration information request in response to receiving a verification response that indicates that the device is verified and/or after a connection is established with a target device.

In at least one embodiment, the verification engine 314, a module of the configuration engine 302, may be configured to verify an identity of a device. In some examples, the verification engine 314 may be configured to check a device identifier (e.g., the device identifier received in a connection request and provided by the connection manager 310) against a record (e.g., containing a previously stored device identifier). The record may contain a single device identifier or many device identifiers. The record, in some cases, may constitute a whitelist operating on an intermediary device and/or a routing device. In at least one example, the verification engine 314 may be configured to access the configuration information data store 306, a data store configured to store records (e.g., configuration information) that includes at least one or more device identifiers (e.g., corresponding to one or more target devices). The configuration information data store 306 may be a locally-stored data store, or the configuration information data store 306 may be remote with respect to the device operating the verification engine 314 (e.g., the intermediary device which may include the user device 204(1), the user device 204(2), the service provider computer(s) 102).

In at least one embodiment, the verification engine 314 may be configured to verify a device identifier against user account information contained in the user account data store 304. In some examples, the user account data store 304 may maintain user account information associated with a user account. As a non-limiting example, the user account information may include order history, shipping information, network information (e.g., a network identifier, a network password, etc.), user credentials (e.g., a username and password of the user account), one or more geographic locations (e.g., a home address, a work address, a shipping address, etc.), one or more user device identifiers (e.g., corresponding to one or more known user devices). user preferences with respect to notifications, to name a few. The user preferences, for example, may indicate that the user has enabled an auto-configuration option that enables a device to be configured without requesting approval via a notification.

In at least one example, the verification engine 314 may be configured to analyze order history and/or shipping information to ascertain whether the device is verified. By way of example, the verification engine 314 may be configured to determine that the device corresponding to a device identifier (e.g., the device identifier received in a verification request) is verified when the user account information (e.g., the order history) indicates that a device corresponding to the device identifier was ordered with the user account corresponding to the user account information. In some examples, the verification engine 314 may determine that a device is verified when shipping information associated with the user account indicates that the device has been shipped and/or delivered. In some cases, the verification engine 314 may be configured to determine that the device is not verified if the device corresponding to the device identifier received in a verification request has been shipped, but not yet delivered. In at least one example, the verification engine 314 may be configured to determined that the device is not verified if the device corresponding to the device identifier received in a verification request has not yet been shipped or if the device was not ordered via the user account.

As another example, the verification engine 314 may be configured to analyze user account information for the user account to determine whether a target device and an intermediary device (e.g., a router) have been previously associated. In such cases, the verification engine 314 may determine that the device is verified if the verification request indicates two device identifiers for which an association is found. The verification engine 314 may be configured to determine that the device is not verified if the verification request indicates two device identifiers for which no association can be found.

As another example, the verification engine 314 may be configured to compare a received geographic location associated with the device for which verification is requested to a stored geographic location. In such cases, the verification engine 314 may determine that the device is verified the received geographic location is within a threshold distance (e.g., 500 feet, 3 meters, 1 mile, etc.) of a stored geographic location. The verification engine 314 may be configured to determine that the device is not verified if the verification request indicates a location that is not within the threshold distance of the stored geographic locations.

The verification engine 314 may be configured to compare one or more received device identifiers and a stored list of associated devices. For example, a user associated with a target device may also be associated with numerous other devices (e.g., a laptop, a cellphone, a routing device, etc.) In such cases, the verification engine 314 may determine that the device is verified if a threshold number (e.g., 1, 2, 5, etc.) of the associated devices are provided in the verification request. The verification engine 314 may be configured to determine that the device is not verified if the verification request does not include at least the threshold number of associated devices.

The verification engine 314 may be configured to utilize any combination of verification information (e.g., geographic location, detected devices, MAC ID, other device identifier, etc.) to determine a confidence value that indicates a likelihood that the device is an expected device and, in some cases, that the device is operating at an expected location. If the confidence value is greater than or equal to a threshold value, then the verification engine 314 may provide a verification response that indicates that the device is verified. If the confidence value is less than the threshold value, then the verification engine 314 may provide a verification response that indicates that the device is not verified.

The verification engine 314 may be further configured to provide a verification code in response to a verification request. As a non-limiting example, the verification engine 314 may provide a verification code to an intermediary device that is associated with the user. In at least one example, verification may depend on entry of the verification code at the target device. If the code is entered correctly at the target device, the verification engine 314, upon verifying the input, may provide a verification response that indicates that the target device is verified. If the input code does not match the code provided, the verification engine 314 may provide a verification response that indicates that the target device is not verified.

Regardless of the particular verification procedure executed to verify a device identifier, the verification engine 314 may be configured to provide a verification response (e.g., to the connection manager 310) that indicates whether the device identifier was verified.

In accordance with at least one embodiment, the notification manager 312, a component of the configuration engine 302, may be configured to provide one or more notifications to the user device(s) 204. The notification manager 312 may be responsible for determining a device on which the notification is to be provided. For example, the notification manager 312 may determine that a notification is to be provided on an intermediary device (e.g., the user device 204(1) and/or the user device 204(2)) and/or a target device (e.g., the user device 204(3)). In some embodiments, the notification may pertain to requesting permission to conduct configuration procedures to configure a target device. In at least one example, the notification manager 312 may provide a notification visually (e.g., a text message, an email, a push notification, or any suitable form of electronic communication) and/or audibly (e.g., a spoken phrase provided on one or more devices). The notification manager 312 may be configured to receive user-input (e.g., textual input, mouse-click, option selection, voice command, touch input, etc.) corresponding to the notification. As a non-limiting example, the notification manager 312 may provide a notification (e.g., a push notification) that may cause a device to provide a spoken notification such as "Would you like to configure your new device using your phone?" In some cases, the user may respond by touching an option provided on the new device and/or their phone, or the user may say "Yes" or "No," for example, to provide user input. Other voice commands may be utilized such as "No, I want to configure my new device with the same settings as my laptop." In at least one embodiment, the notification manager 312 may be configured to receive and parse the voice command (e.g., utilizing voice recognition techniques) to determine, in this instance, that the user's laptop should be utilized as the intermediary device rather than the user's cellphone.

Generally, the user-input may indicate a user's willingness to allow configuration procedures to be executed (e.g., configuration procedures for configuring a device such as a target device). The notification manager 312 may be configured to receive and process the user-input. In some cases, when no user input is received within a threshold period of time of providing the notification, the notification manager 312 may be configured to consider the lack of user input as an indication of approval, or in some cases, rejection.

In at least one embodiment, the notification manager 312 may analyze user account information (e.g., user preferences) to determine whether a configuration procedure is to be approved/rejected. In a non-limiting example, user preference information associated with the user account may indicate that the user has previously authorized a configuration procedure (e.g., for the device corresponding to the device identifier and/or any device corresponding to any device identifier). Accordingly, the notification manager 312 may suppress a notification when user preference information indicates that the user has previously authorized a configuration procedure.

In some embodiments, the notification manager 312 may be configured to stimulate the connection manager 310 to perform connection procedures, or the verification engine 314 to perform verification procedures, or the configuration manager 316 to perform configuration procedures, or any suitable combination of the above. In other words, the notification manager 312 may provide a notification to a device and receive user-input as a precursor to any functionality provided by the other modules of the configuration engine 302. In fact, any suitable combination of functionality provided by the other modules of the configuration engine 302 may depend on receiving a notification response or suitable stimulation from the notification manager 312.

In accordance with at least one embodiment, the configuration manager 316 may be configured to perform one or more configuration procedures. The configuration manager 316 may be configured to receive a configuration information request from, for example, the connection manager 310 and/or the verification engine 314. The configuration manager 316 may be operating on the same (or different) device as that which the connection manager 310 and/or the verification engine 314 are operating. Upon receiving a configuration information request, the configuration manager 316 may be configuration to access the user account data store 304. In at least one example, user account information contained in the user account data store 304 may indicate configuration information to be provided to the device associated with a received device identifier (e.g., configuration information contained in the configuration information data store 306. In at least one example, at least a portion of the configuration information (e.g., a network identifier, a network password, a username and password associated with the user account) may be stored as part of the user account information and/or as part of the configuration information data store 306.

In at least one example, the configuration manager 316 may be configured to transmit configuration information (e.g., obtained from the configuration information data store 306, obtained from the user account data store 304) to the device requesting the configuration information, or the device for which configuration information is requested. In some examples, the configuration request may contain a network address for the device to which the configuration information is to be transmitted. Configuration information, as discussed above, may include a network identifier, a network password, a username/password associated with a user account, software application information, firmware information, or any suitable information needed to configure a device for operation. Configuration information may be stored in the configuration information data store 306 and/or the user account data store 304, as a record associated with a device identifier, a user account, or the like. In at least one embodiment, transmission of the configuration information may include providing instructions (e.g., with the configuration information) that instruct the receiving device (e.g., the target device) to store, download/install, or otherwise configured the receiving device using the configuration information. In at least one embodiment, the receiving device may be configured to execute instructions that cause the device to perform operations for configuring itself using the configuration information received. Configuration of the device may include storing data in local memory, performing software application download(s)/installation(s), performing firmware download(s)/installations, or the like.

In at least one example, the configuration manager 316 may operate on a target device (e.g., the user device 204(3)) or an intermediary device (e.g., the user device 204(1), the user device 204(2), etc.). In such cases, the configuration manager 316 may be configured to receive configuration information and perform a number of configuration procedures. For example, upon receipt of a network identifier and/or password, the configuration manager 316 may be configured to transmit a connection request to a device corresponding to the network identifier (e.g., a router). The connection request may be received by a connection manager 310 operating on the device to which connection is requested. In at least one example, the configuration manager 316, operating on a target device, may be configured to download, install, or otherwise store data as indicated/provided in the configuration information received. As a non-limiting example, the configuration information may indicate one or more software applications that are to be installed on the target device and a location from which download may be requested. Accordingly, the configuration manager 316 may be configured to request the one or more software applications from the location indicated and to install such applications when the download is complete. The configuration information may indicate firmware updates and/or software updates. In such cases, the configuration manager 316 may be configured to procure such updates (e.g., form the location provided) and install such updates accordingly.

In at least one example, the configuration manager 316 (e.g., operating on an intermediary device) may be configured to receive and/or obtain configuration information and forward the configuration information to a target device. In some cases, the configuration information may be received from the service provider computer(s) 102 and/or the configuration information may be obtained from local memory of the intermediary device.

FIGS. 4-7 provide numerous example processes for implementing aspects of the configuration engine 302 of FIG. 3. Although some examples illustrate situations utilizing one-way authentication techniques where the identity of the target device is verified, it should be appreciated that any example provided herein may instead utilize two-way authentication techniques where the identity of both the target device and the intermediary device (or the service provider computer) is verified. Thus, in any of the examples provided herein, two-way authentication is contemplated between any suitable combination of two devices.

Furthermore, for ease of explanation, examples herein may verify the identity of a device utilizing a device identifier (e.g., MAC ID) alone. However, it should be appreciated that in any example herein, the device may be verified utilizing any suitable verification information. For example, verification requests may further include one or more additional device identifiers (e.g., identifiers for devices within a threshold distance and/or detected by the target device), a geographic location associated with the device for which verification is requested, a code, or the like. The verification information (e.g., the MAC ID of the device, the additional device identifier(s), the geographic location, the code, etc.) may be utilized to determine a confidence value indicating a likelihood that the device is authentic and, in some cases, operating in an expected environment.

Although parts of the verification process may be depicted in the following examples as occurring on particular devices, it should be appreciated that the verification process may occur on any intermediary device (e.g., a user device, a routing device, etc.) or the service provider computer(s) 102, or any suitable combination of the above. Additionally, although not depicted in every example, any example provided herein may include transmission of a verification code to any suitable device (other than the device for which verification is requested) as part of the verification process. The verification code may be input at the device for which verification is requested and utilized to verify the device (e.g., the device is verified if the code is input correctly or verification fails if the code is input incorrectly).

Figure 4:
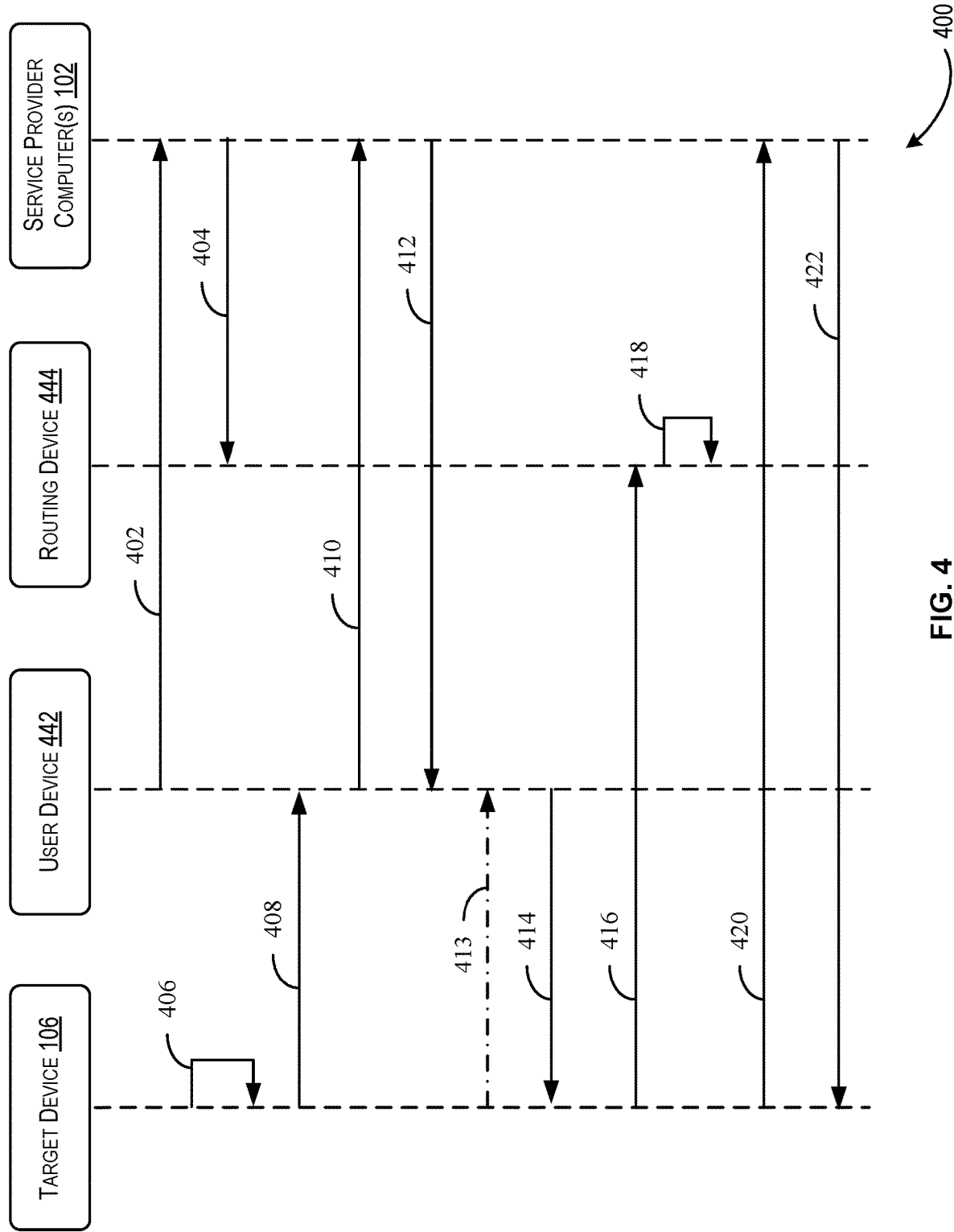
FIG. 4 is a schematic diagram illustrating an example environment suitable for implementing aspects of a configuration engine, in accordance with at least one embodiment.

Moving on to the examples, FIG. 4 is a schematic diagram illustrating an example process 400 suitable for implementing aspects of a configuration engine 302 of FIG. 3, in accordance with at least one embodiment. The process 400 may begin at 402 where the user device 442 (e.g., the user device 204(1) of FIG. 2) interacts with the service provider computer(s) 102 to procure the target device 106 (e.g., the user device 204(3) of FIG. 2). As described throughout, the target device 106 may be procured from a website hosted by the service provider computer(s) 102.

At 404, the service provider computer(s) 102 may provide the routing device 444 (e.g., the user device 204(3) of FIG. 2) a device identifier (e.g., a MAC ID or other suitable unique identifier) identifying the target device 106. The device identifier may be provided at 404 as part of a procurement process associated with the target device 106. By way of example, the device identifier may be provided subsequent to a transaction involving the target device 106 such as a financial transaction to purchase the target device 106, shipping order creation for delivering the target device 106, or the like. Upon receipt of the MAC ID, the routing device 444 may be configured to store the MAC ID. For example, the routing device 444 may be configured to store the MAC ID of the target device 106 in a whitelist maintained by the routing device 444. The whitelist may identify device identifier for which connection may be allowed. In some examples, devices with identifiers that are not identified in the whitelist maintained by the routing device 444 may be restricted from connecting, or otherwise exchanging information, with the routing device 444.

At 406, the target device 106 may be powered on and a device scan performed. In at least one embodiment, the target device 106 may be configured to store a previously determined code (e.g., a Bluetooth pairing code) that enables connection with another device (e.g., the user device 442). Similarly, the user device 442 may be configured to store a previously determined code that matches the code stored in memory of the target device 106. Upon detecting the user device 442, the target device 106 may transmit a connection request to the user device 442 at 408. The connection request may be in any suitable format. In some examples, the connection request may be transmit via a short-range wireless communications protocol such as Bluetooth. In at least one embodiment, the connection request may include a device identifier of the target device 106 (e.g., a MAC ID of the target device 106). Although not depicted, the connection request transmission at 408 may enable a handshaking procedure to be performed by the target device 106 and the user device 442 to establish a connection between the two devices. Once connected, the target device 106 and the user device 442 may exchange any suitable data via the established connection.

At 410, the user device 442 may transmit a verification request to the service provider computer(s) 102. The verification request may be in any suitable format and may be transmitted via any suitable means (e.g., via the networks 208 of FIG. 2). In some embodiments, the verification request may include user credentials for accessing a user account maintained by the service provider computer(s) 102, and/or a device identifier (e.g., a MAC ID) of the target device 106. Alternatively, the user device 442 may forgo the verification request and instead verify that a device identifier provided by the target device 106, such as one provided in the connection request at 408, matches a device identifier stored in local memory of the user device 442.

Returning to the example depicted, at 412, the service provider computer(s) 102 may provide a verification response indicating that the device identifier provided in the verification request is trusted. In some examples, verification by the service provider computer(s) 102 may include analyzing user account data, such as purchase history, to determine that a device having the same device identifier as the target device 106 has been purchased. In at least one example, verification by the service provider computer(s) 102 may further include reviewing shipping order information to confirm that the purchased device having the MAC ID corresponding to the verification request has been shipped and/or delivered. In some embodiments, the service provider computer(s) 102 may verify that a device having the same MAC ID was purchased, shipped, and delivered (or any suitable combination of the above) before returning a verification response indicating that the device corresponding to the device identifier should be trusted.

In at least one embodiment, the verification response may further include a verification code generated by the service provider computer(s) 102. In some examples, the user device 442, may present the verification code to the user (e.g., via notification, push notifications, text message, etc.). The user may be prompted to enter the verification code at the target device 106. Accordingly, in some examples, the verification code may be entered at the target device 106 and provided to the user device 442 at 413. If the code provided at the target device 106 matches the code received from the service provider computer(s) 102, then the target device 106 may be considered verified. If the codes do not match, then the target device 106 may be considered unverified and the process may terminate.

At 414, subsequent to receiving a verification response indicating that the device identifier corresponding to the target device 106 should be trusted, the user device 442 may transmit configuration information to the target device 106. By way of example, the user device 442 may transmit a network identifier and network password corresponding to the routing device 444 to the target device 106. The user device 441 may obtain the network identifier and the network password from locally stored data, or the user device 441 may receive the network identifier and the network password as part of the verification response provided by the service provider computer(s) 102 at 412. Additionally, or alternatively, the user device 442 may transmit a username and password associated with a user account maintained by the service provider computer(s) 102.

At 416, the target device 106 may transmit a connection request to the routing device 444. The connection request may be directed to the routing device 444 due to the network identifier provided by the user device 442 matching the network identifier associated with the routing device 444. In at least one example, the target device 106 will not transmit a connection request to the routing device 444 unless the network identifier provided by the user device 442 matches the network identifier associated with the routing device 444. In some embodiments, the connection request may include the device identifier (e.g., the MAC ID) of the target device 106. At 418, the routing device 444 may verify that the MAC ID received in the connection request matches a MAC ID identified in the whitelist maintained by the routing device 444. If so, the routing device 444, may establish a connection (e.g., a wireless, wired, etc.) with the target device 106. In this manner, both the target device 106 and the routing device 444 are assured that the other is a trusted device.

At 420, the target device 106 may transmit a configuration information request to the service provider computer(s) 102. In some examples, the configuration information request may include the username and password provided by the user device 442 at 414. Upon receipt of the configuration information request, and upon verifying the user credentials provided, the service provider computer(s) 102 may transmit configuration information to the target device 106 at 422. Receiving the configuration information may cause the target device 106 to store the configuration information in local memory. In at least one embodiment, receipt of the configuration information may cause the target device 106 to execute one or more configuration procedures such as a software application download and/or install, a firmware update, a software update, or the like.

In at least one embodiment, the configuration information request transmitted at 420 may not include a username and password. In such examples, the configuration information request may simply include the device identifier of the target device 106. Upon receiving the device identifier, the service provider computer(s) 102 may consult user account data to identify a particular user account from which a device associated with that device identifier was procured. If the service provider computer(s) 102 verify that a particular user account was used to procure the target device 106, then the service provider computer(s) 102 can provide a username and password for the user account in addition to any suitable configuration information described above at 422. Thus, in some examples, the target device 106 does not need to obtain a username and password prior to requesting configuration information from the service provider computer(s) 102. Upon completion of the process 400, the target device 106 may be configured to perform various functionality utilizing the configuration information provided by the service provider computer(s) 102.

Figure 5:
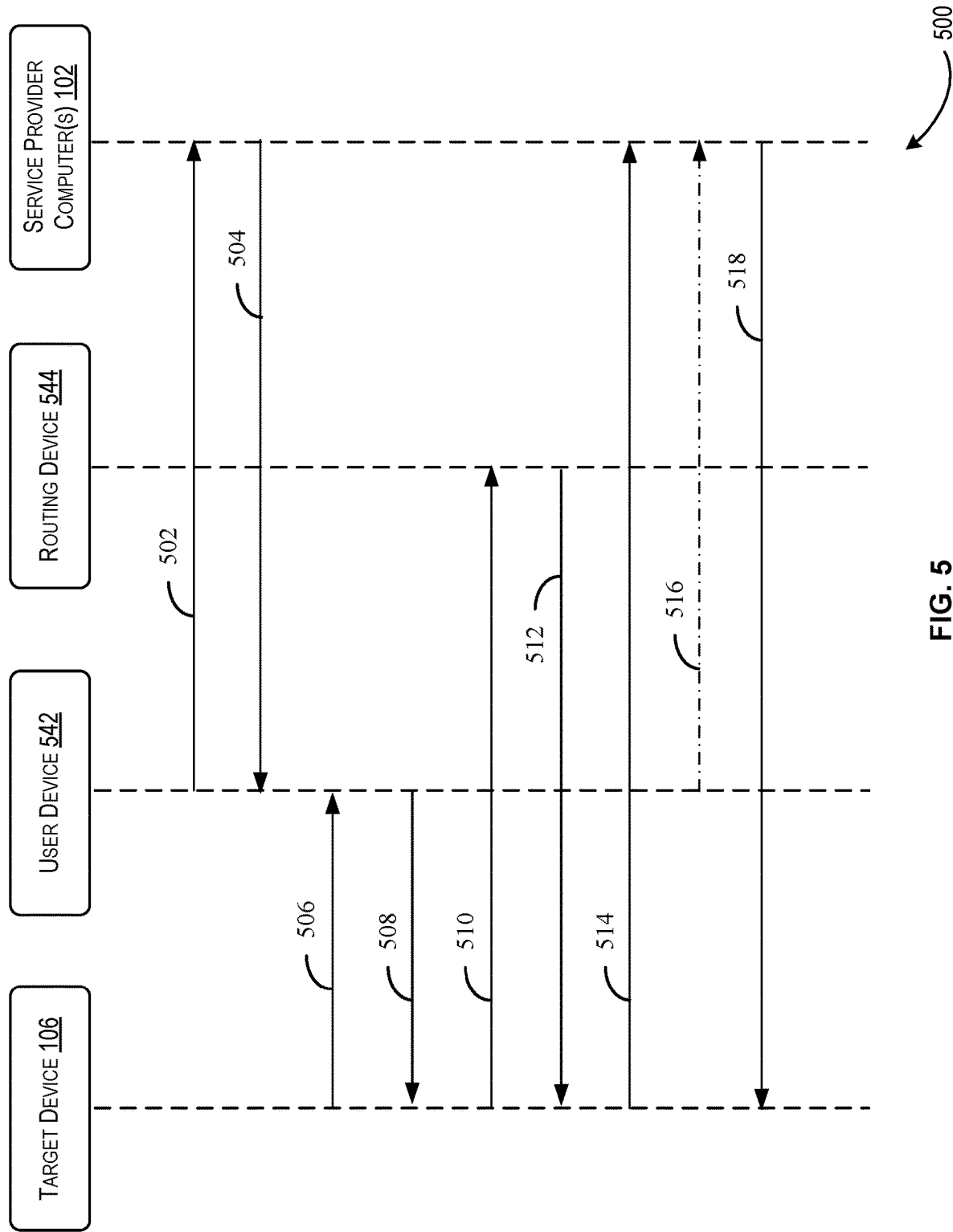
FIG. 5 is a schematic diagram illustrating another example environment suitable for implementing aspects of a configuration engine, in accordance with at least one embodiment.

FIG. 5 is a schematic diagram illustrating another example process 500 suitable for implementing aspects of a configuration engine 302 of FIG. 3, in accordance with at least one embodiment. The process 500 may begin at 502 where the user device 542 (e.g., the user device 204(1) of FIG. 2) interacts with the service provider computer(s) 102 to procure the target device 106 (e.g., the user device 204(3) of FIG. 2).

At 504, the service provider computer(s) 102 may provide the user device 542 a device identifier (e.g., a MAC ID or other suitable unique identifier) identifying the target device 106. The device identifier may be provided at 504 as part of a procurement process associated with the target device 106 such as the one discussed in connection with FIG. 4. Upon receipt, the user device 542 may be configured to store the device identifier in local memory.

At 506, the target device 106 may be powered on and a device scan performed. In at least one embodiment, the target device 106 may be configured to store a previously determined code (e.g., a Bluetooth pairing code) that enables connection with another device (e.g., the user device 442). Similarly, the user device 542 may be configured to store a previously determined code that matches the code stored in memory of the target device 106. Upon detecting the user device 542, the target device 106 may transmit a connection request to the user device 542 at 508. The connection request may be in any suitable format. In some examples, the connection request may be transmit via a short-range wireless communications protocol such as Bluetooth. In at least one embodiment, the connection request may include a device identifier of the target device 106 (e.g., a MAC ID of the target device 106). The user device 542 may determine that a device identifier provided in the connection request matches the device identifier stored in local memory. If the device identifiers do not match, the user device 542 may ignore, or otherwise block, a connection from being established with the target device 106. If the device identifiers do match, then a connection may be enabled between the two devices. Once connected, the target device 106 and the user device 542 may exchange any suitable data via the established connection.

At 508, the user device 542 may transmit configuration information to the target device 106. By way of example, the user device 542 may transmit a network identifier and network password corresponding to the routing device 444 to the target device 106. The transmission at 508 may further include a username and password corresponding to a user account maintained by the service provider computer(s) 102. The user device 441 may obtain the configuration discussed herein from locally stored data, or the user device 441 may request the configuration information from the service provider computer(s) 102.

At 510, the target device 106 may transmit a connection request to the routing device 544. The connection request may include the network password provided by the user device 542 at 508. The connection request may be directed to the routing device 544 due to the network identifier provided by the user device 542 matching the network identifier associated with the routing device 544. In at least one example, the target device 106 will not transmit a connection request to the routing device 544 unless the network identifier provided by the user device 542 matches the network identifier associated with the routing device 544. Upon receipt of the connection request and verification of the network password, the routing device 544, may establish a connection (e.g., a wireless, wired, etc.) with the target device 106 at 512.

At 514, the target device 106 may transmit a configuration information request to the service provider computer(s) 102. In some examples, the configuration information request may include the username and password provided by the user device 542 at 508. Upon receipt of the configuration information request, and upon verifying the user credentials provided, the service provider computer(s) 102 may transmit configuration information to the target device 106. Receiving the configuration information may cause the target device 106 to store the configuration information in local memory. In at least one embodiment, receipt of the configuration information may cause the target device 106 to execute one or more configuration procedures for performing at least one of the following: a software application download and/or install, a firmware update, a software update, or the like.

In at least one embodiment, at 516, the configuration information request may be alternatively requested by the user device 542 on behalf of the target device 106. In such examples, the configuration information request may include a network address of the target device 106 and the device identifier of the target device 106. Upon receipt, the service provider computer(s) 102 may consult user account data to identify a particular user account from which a device associated with that device identifier was procured. If the service provider computer(s) 102 verifies that a particular user account was used to procure the target device 106, then, at 518, the service provider computer(s) 102 can provide a username and password for the user account in addition to any suitable configuration information described above to the network address provided in the configuration information request. Thus, in some examples, the target device 106 does not need to obtain a username and password prior to requesting configuration information from the service provider computer(s) 102. Upon completion of the method 500, the target device 106 may be configured to perform various functionality utilizing the configuration information provided by the service provider computer(s) 102.

Figure 6:
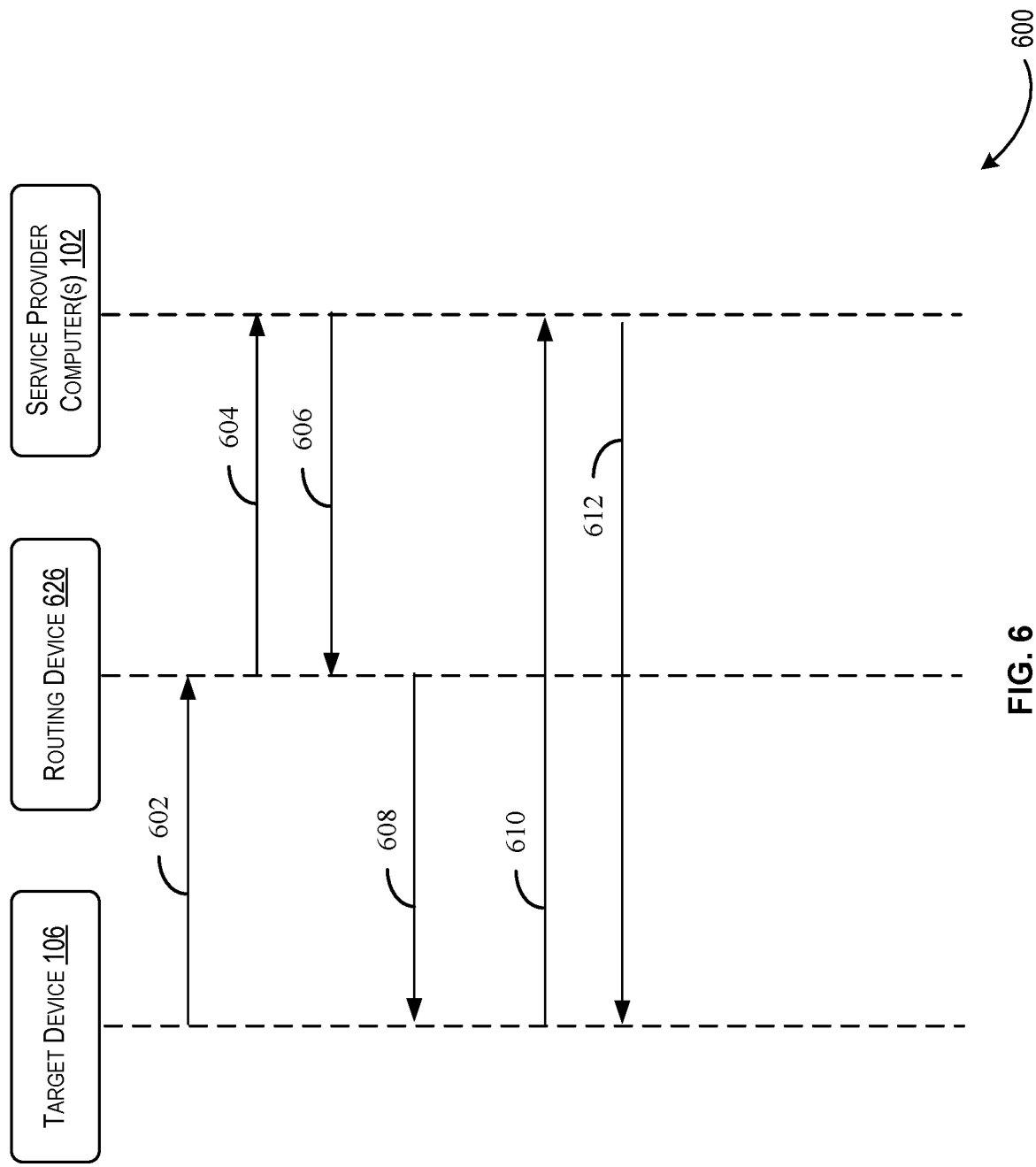
FIG. 6 is a schematic diagram illustrating yet another example environment suitable for implementing aspects of a configuration engine, in accordance with at least one embodiment.

FIG. 6 is a schematic diagram illustrating yet another example process 600 suitable for implementing aspects of a configuration engine 302 of FIG. 3, in accordance with at least one embodiment. The flow may begin at 602, where the target device 106 may send a connection request to the routing device 626 (e.g., the user device 204(2) of FIG. 2). The connection request may include a device identifier (e.g., an alphanumeric string, a MAC ID, etc.) corresponding to the target device 106. In at least one embodiment, a network identifier and network password corresponding to the routing device 626 may have been previously stored in memory of the target device 106 (e.g., as part of a fulfillment process conducted on behalf of the entity from which the target device 106 was obtained). The target device 106 may be configured to send the connection request when the network identifier stored in memory matches the network identifier corresponding to the routing device 626 and detected by the target device 106. The connection request may include the network password stored in memory of the target device 106.

At 604, upon receiving a connection request including a device identifier, the routing device 626 may transmit a verification request to the service provider computer(s) 102. The verification request may include the device identifier corresponding to the target device 106 and, in some cases, the device identifier and/or the network identifier associated with the routing device 626. Upon receipt, the service provider computer(s) 102 may be configured to verify that the target device 106 is associated with a user account that is also associated with the routing device 626. In some examples, the routing device 626 may store a username and password associated with a user account maintained by the service provider computer(s) 102. In these examples, the verification request may further include the username and password to enable the service provider computer(s) 102 to access the user account first in order to analyze user account history to verify that the target device 106 was procured by the user account.

Additionally, or alternatively, the service provider computer(s) 102 may verify the identity of the target device 106 by consulting a mapping between the target device 106 and the routing device 626 and/or the network identifier associated with the routing device 626. This mapping may be stored as part of the user account and maintained by the service provider computer(s) 626. In at least one example, the association may be provided by user input. In other examples, the association may be determined from other user devices associated with the user account and having previous or current associations with the routing device 626. For example, a smartphone associated with the user account may have a current connection with the routing device 626. At any suitable time, the connection information (e.g., a network identifier and a network password) may be communicated to the service provider computer(s) 102 from the smartphone and stored in the user account for future use. If the service provider computer(s) 102 are unable to verify an association between the target device 106 and the routing device 626, or the service provider computer(s) 102 are unable to verify an association between the target device 106 and the user account corresponding to the credentials provided by the routing device 626, then the service provider computer(s) 102 may send a verification response to the routing device 626 indicating that the target device 106 cannot be verified. The routing device 626 may, in turn, refuse the connection request initiated by the target device 106.

If the service provider computer(s) 102 are able to verify an association between the target device 106 and the routing device 626 and/or user device, the service provider computer (s) 102 may transmit a verification response at 606. The verification response may indicate that the target device 106 is verified. Upon receipt, or at any suitable time, the routing device 626 may be configured to establish a connection between the target device 106 and the routing device 626. In some examples, this results in the target device 106 being allowed access to a wired/wireless network provided in part by the routing device 626. At 608, upon establishing the connection, the routing device 626 may transmit the stored username and password corresponding to the user account to the target device 106. Upon receipt, the target device 106 may be configured to store such information in local memory.

At 610, the target device 106 may transmit a configuration information request to the service provider computer(s) 102. In some examples, the configuration information request may include the username and password provided by the routing device 626 at 608. Upon receipt of the configuration information request, and upon verifying the user credentials provided, the service provider computer(s) 102 may transmit configuration information to the target device 106 at 612. Receiving the configuration information may cause the target device 106 to store the configuration information in local memory. In at least one embodiment, receipt of the configuration information may cause the target device 106 to execute one or more configuration procedures for performing at least one of the following: a software application download and/or install, a firmware update, a software update, or the like.

In at least one embodiment, the configuration information request may be alternatively requested by the routing device 626 on behalf of the target device 106. In such examples, the configuration information request may include a network address of the target device 106. Upon receipt, the service provider computer(s) 102 can provide a username and password for the user account, in addition to any suitable configuration information described above, to the network address provided in the configuration information request. Thus, in some examples, the target device 106 does not need to obtain a username and password prior to receiving configuration information from the service provider computer(s) 102. Upon completion of the method 600, the target device 106 may be configured to perform various functionality utilizing the configuration information provided by the service provider computer(s) 102.

Figure 7:
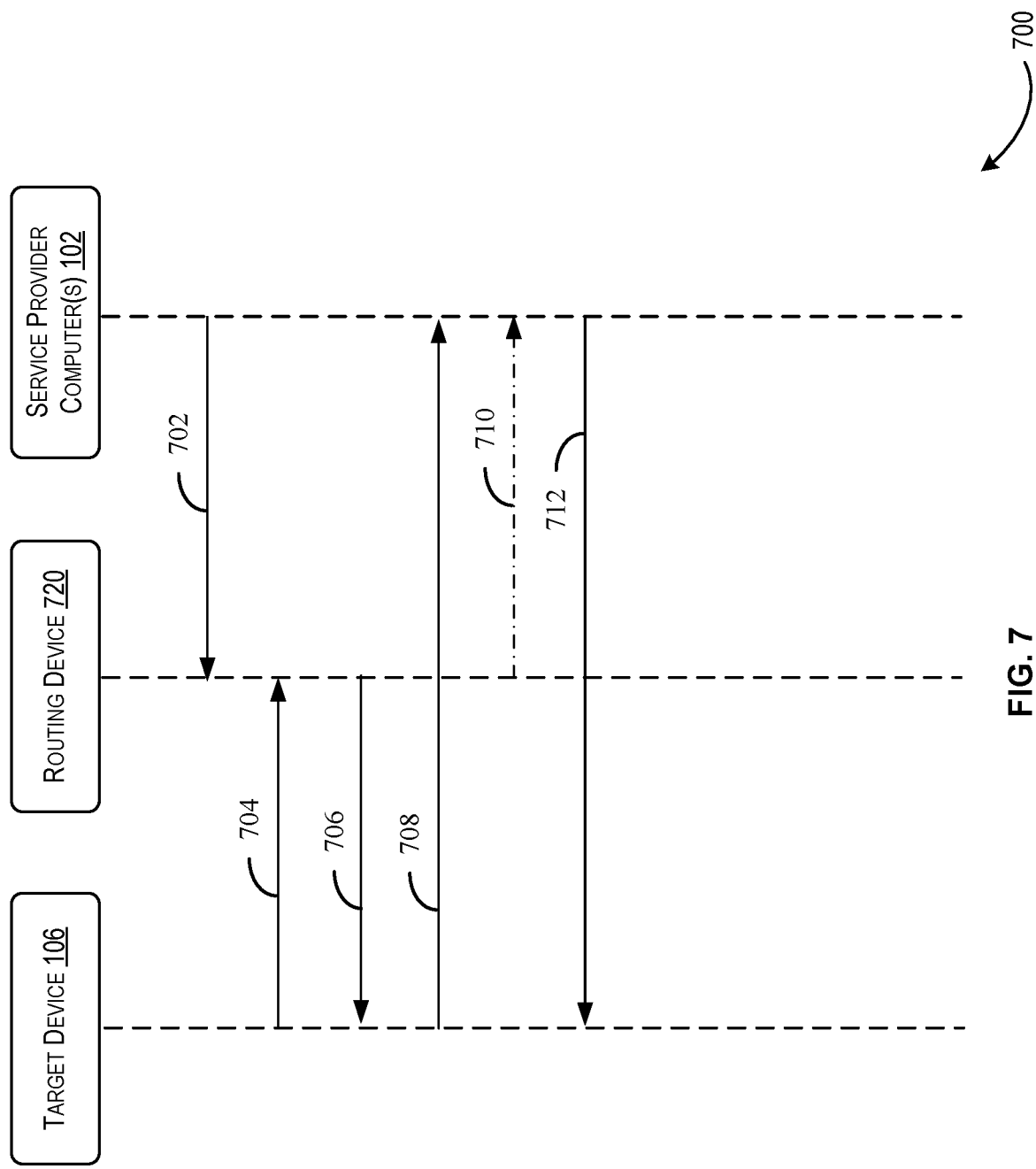
FIG. 7 is a schematic diagram illustrating still one further example environment suitable for implementing aspects of a configuration engine, in accordance with at least one embodiment.

FIG. 7 is a schematic diagram illustrating still one further example environment 700 suitable for implementing aspects of a configuration engine 302 of FIG. 3, in accordance with at least one embodiment. The flow may begin at 702, where the service provider computer(s) 102 may provide a device identifier of the target device 106 to the routing device 720 (e.g., the user device 204(2) of FIG. 2). The device identifier may be provided as part of a fulfillment process for the target device 106. The service provider computer(s) 102 may identify the routing device 720 from information stored in the user account used to procure the target device 106. By way of example, the service provider computer(s) 102 may verify the identity of the routing device 720 by identifying a network address/network identifier associated with the user account. In at least one example, the network address/ identifier may be provided by user input and stored as part of user account information. In other examples, the association may be determined from another user device associated with the user account that has previous or current connections with the network corresponding to the network address/identifier. For example, a smartphone associated with the user account may have a current connection with the routing device 720. At any suitable time, the connection information (e.g., a network identifier, address of the routing device 720, and/or a network password) may be communicated to the service provider computer(s) 102 from the smartphone and stored in the user account for future use. Thus, the service provider computer(s) 102 may access user account information to identify the recipient (e.g., the routing device 720) of the device identifier corresponding to the target device 106.

At 704, the target device 106 may send a connection request to the routing device 720. The connection request may include a device identifier (e.g., an alphanumeric string, a MAC ID, etc.) corresponding to the target device 106. In at least one embodiment, a network identifier and network password corresponding to the routing device 626 may have been previously stored in memory of the target device 106 (e.g., as part of a fulfillment process conducted on behalf of the entity from which the target device 106 was obtained). The target device 106 may be configured to send the connection request when the network identifier stored in memory matches the network identifier corresponding to the routing device 626 and detected by the target device 106. The connection request may include the network password stored in memory of the target device 106.

Upon receiving a connection request including a device identifier, the routing device 720 may verify that the device identifier received at 704 matches the device identifier stored in memory. If no match exists, the routing device 720 may be configured to reject the connection request. If a match exists, the routing device 720 may establish a connection at 706. Establishing the connection, in at least one example, may include transmitting a network password to the target device 106. Upon receipt, the target device 106 may be configured to store the network password in local memory.

At 708, the target device 106 may transmit a configuration information request to the service provider computer(s) 102. In some examples, the configuration information request may include the device identifier (e.g., the MAC ID) of the target device 106. Upon receipt of the configuration information request, and upon verifying the target device 106 is associated with a user account, the service provider computer(s) 102 may transmit configuration information to the target device 106 at 712. In at least one embodiment, the configuration information may include a username and password associated with the user account, and/or information associated with at least one of a software application, a firmware update, a software update, or the like. Receiving the configuration information may cause the target device 106 to store the configuration information in local memory. In at least one embodiment, receipt of the configuration information may cause the target device 106 to execute one or more configuration procedures corresponding to the configuration information, the configuration procedures enabling performance of at least one of the following: a software application download and/or install, a firmware update, a software update, or the like.

In at least one embodiment, the configuration information request may be alternatively be requested by the routing device 720 on behalf of the target device 106 at 710. In such examples, the configuration information request may include a device identifier of the target device 106 and a network address associated with the target device 106. Upon receipt, the service provider computer(s) 102 can provide a username and password for the user account, in addition to any suitable configuration information described above, to the network address provided in the configuration information request. Thus, in some examples, the target device 106 does not need to obtain a username and password prior to receiving configuration information from the service provider computer(s) 102.

It should be appreciated that any configuration information request received by the service provider computer(s) 102 may cause a verification process to be performed at the service provider computer(s) 102. For example, any suitable information provided in the configuration information request may be utilized to determine that the target device 106 should be trusted. For example, the service provider computer(s) 102 may analyze user account information to determine that the target device 106 was purchased with the user account. In some examples, the service provider computer(s) 102 may determine whether the target device 106 was shipped, and in some cases, if the shipping information associated with the user account indicates that the target device 106 was delivered. Additionally, or alternatively, the service provider computer(s) 102 may be configured to determine whether the routing device 720 is the same routing device to which the device identifier was previously provided. If the target device 106 was not procured from the user account, was not shipped, or was shipped but not yet delivered, or if the routing device 720 is not the device to which the device identifier for the target device 106 was provided, then the service provider computer(s) 102 may be configured to reject the configuration information request. In some examples, the service provider computer(s) 102 may use each of the determinations above, or a suitable combination, to determine whether the configuration information request should granted or rejected.

Upon completion of the method 700, the target device 106 may be configured to perform various functionality utilizing the configuration information provided by the service provider computer(s) 102.

Figure 8:
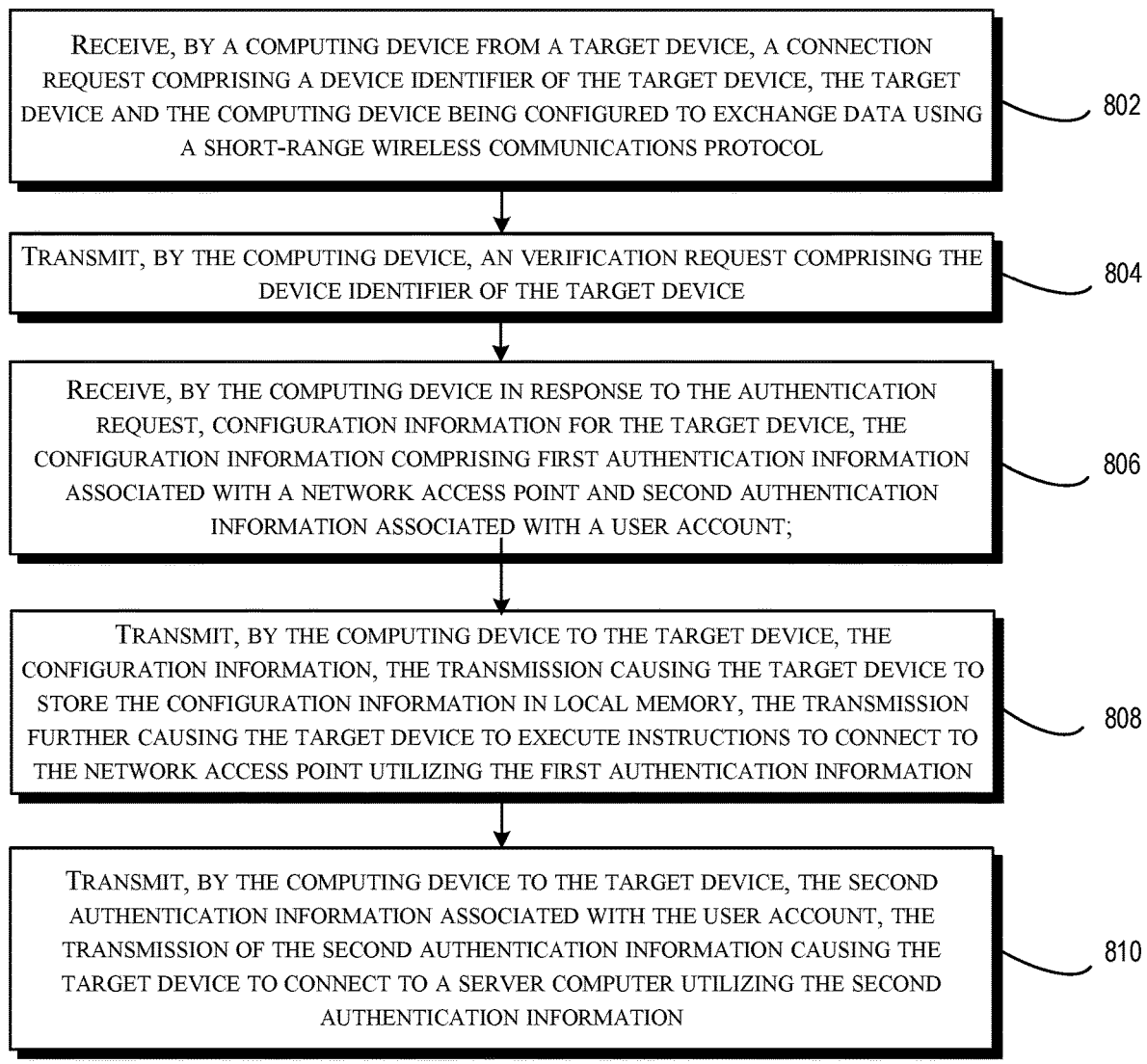
FIG. 8 is a flowchart illustrating an example method for configuring a target device, in accordance with at least one embodiment.

FIG. 8 is a flowchart illustrating an example method 800 for configuring a target device, in accordance with at least one embodiment. The method 800 may begin at block 802, where a computing device (e.g., user device 204(1) of FIG. 2) receives, from a target device (e.g., the user device 204(3) of FIG. 2), a connection request comprising a device identifier (e.g., a MAC ID) of the target device. In at least one embodiment, the target device and the computing device being configured to exchange data using a short-range wireless communications protocol (e.g., Bluetooth).

At 804, a verification request may be transmitted, and the verification request may comprise the device identifier of the target device. In at least one embodiment, the verification request may be directed to a verification entity (e.g., the service provider computer(s) 102 of FIG. 1-7).

At 806, in response to the verification request, configuration information for the target device may be received (e.g., from the service provider computer(s) 102). In some examples, the configuration information may comprise first authentication information associated with a network access point (e.g., a network identifier, a network password, or the liked) and second authentication information associated with a user account (e.g., a username and password associated with the user account).

At 808, the configuration information may be transmitted to the target device. In at least one example, the transmission may cause the target device to store the configuration information in local memory. In some embodiments, the transmission may further cause the target device to execute instructions to connect to a network access point utilizing the first authentication information.

At 810, the second authentication information associated with the user account may be transmitted to the target device. In some embodiments, the transmission of the second authentication information may cause the target device to connect to a server computer (e.g., the service provider computer(s) 102) utilizing the second authentication information.

Figure 9:
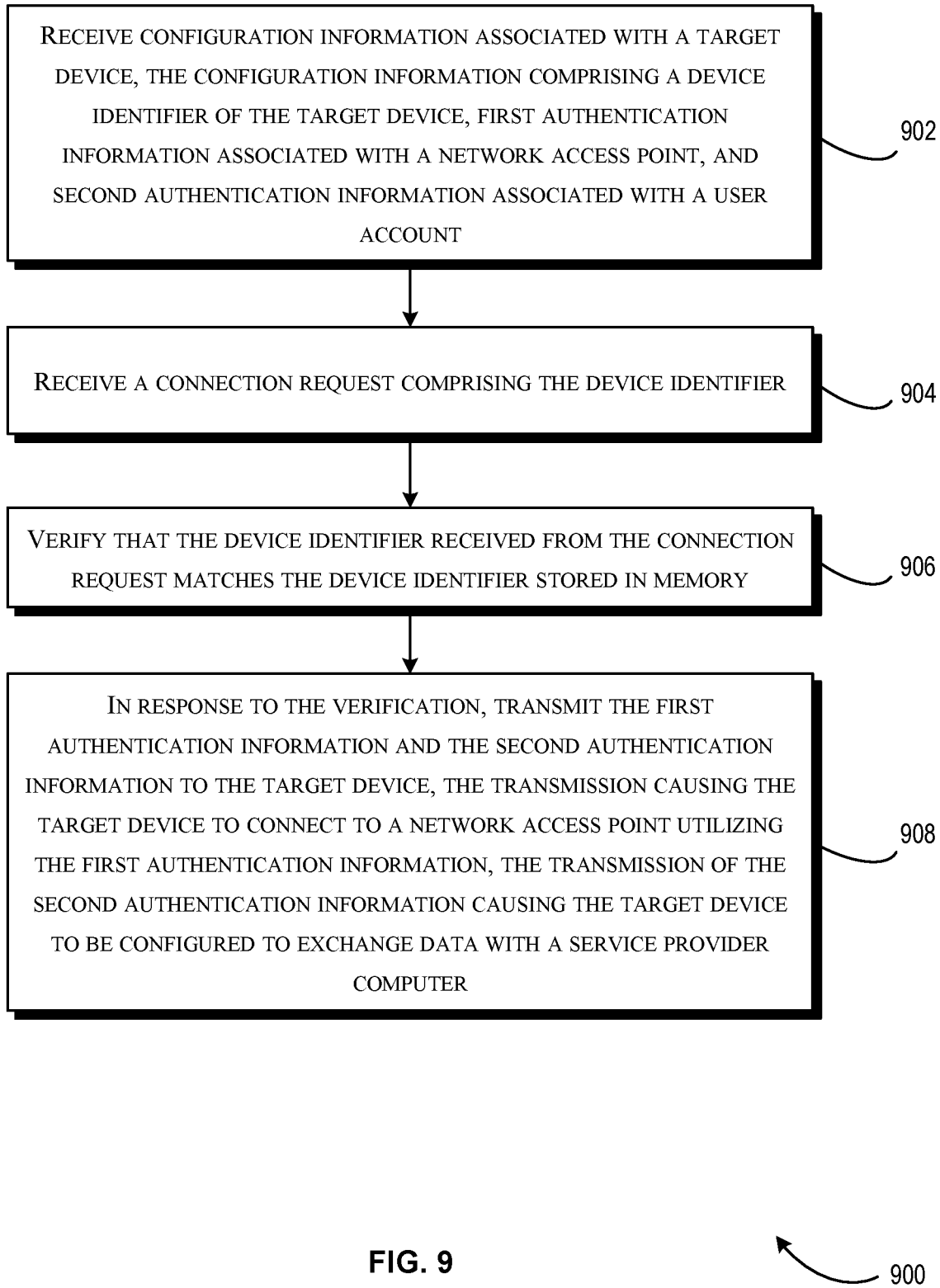
FIG. 9 is a flowchart illustrating an additional example method for configuring a target device, in accordance with at least one embodiment.

FIG. 9 is a flowchart illustrating an additional example method 900 for configuring a target device, in accordance with at least one embodiment. The method 900 may begin at block 902, where configuration information associated with a target device may be received (e.g., by an intermediary device such as user device 204(1) of FIG. 2). In at least one embodiment, the configuration information comprising a device identifier of the target device (e.g., the user device 204(3) of FIG. 2), first authentication information associated with a network access point (e.g., the user device 204(2)), and second authentication information associated with a user account. In at least one example, the user account may be maintained by service provider computer(s) 102 of FIGS. 1-7.

At 904, a connection request comprising the device identifier may be received. In some examples, the connection request may be received from the target device via a traditional wireless or short-range wireless communications protocol.

At 906, the device identifier received from the connection request may be verified. In some examples, the device identified is verified by matching the device identifier received to a device identifier stored in memory (e.g., on the user device 204(1)).

At 908, in response to the verification, the first authentication information and the second authentication information may be transmitted to the target device. In some examples, the transmission may cause the target device to connect to a network access point (e.g., the user device 204(2)) utilizing the first authentication information. In some embodiments, the transmission of the second authentication information may cause the target device to be configured to exchange data with a service provider computer (e.g., the service provider computer(s) 102).

Figure 10:
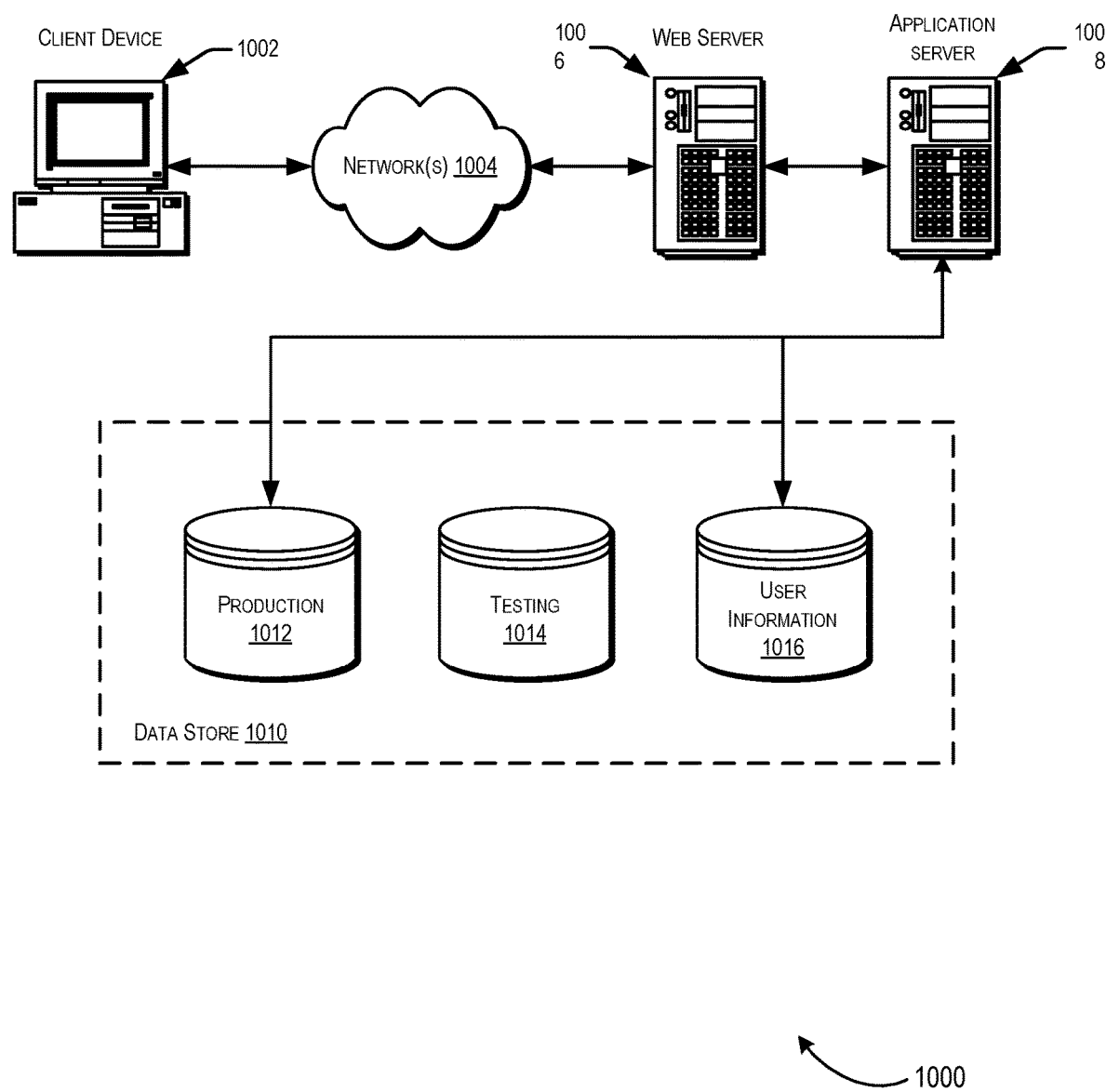
FIG. 10 is a schematic diagram illustrating an example environment for implementing aspects in accordance with at least one embodiment described herein.

FIG. 10 illustrates aspects of an example system 1000 for implementing aspects in accordance with various embodiments. As will be appreciated, although a Web-based environment is used for purposes of explanation, different environments may be used, as appropriate, to implement various embodiments. The environment includes an electronic client device 1002, which can include any appropriate device operable to send and receive requests, messages, or information over an appropriate network 1004 and convey information back to a user of the device. Examples of such client devices include personal computers, cell phones, handheld messaging devices, laptop computers, set-top boxes, personal data assistants, electronic book readers, and the like. The network can include any appropriate network, including an intranet, the Internet, a cellular network, a local area network, or any other such network or combination thereof. Components used for such a system can depend at least in part upon the type of network and/or environment selected. Protocols and components for communicating via such a network are well known and will not be discussed herein in detail. Communication over the network can be enabled by wired or wireless connections and combinations thereof. In this example, the network includes the Internet, as the environment includes a Web server 1006 for receiving requests and serving content in response thereto, although for other networks an alternative device serving a similar purpose could be used as would be apparent to one of ordinary skill in the art.

The illustrative environment includes at least one application server 1008 and a data store 1010. It should be understood that there can be several application servers, layers, or other elements, processes, or components, which may be chained or otherwise configured, which can interact to perform tasks such as obtaining data from an appropriate data store. As used herein the term "data store" refers to any device or combination of devices capable of storing, accessing, and retrieving data, which may include any combination and number of data servers, databases, data storage devices, and data storage media, in any standard, distributed, or clustered environment. The application server can include any appropriate hardware and software for integrating with the data store as needed to execute aspects of one or more applications for the client device, handling a majority of the data access and business logic for an application. The application server provides access control services in cooperation with the data store and is able to generate content such as text, graphics, audio, and/or video to be transferred to the user, which may be served to the user by the Web server in the form of HyperText Markup Language ("HTML"), Extensible Markup Language ("XML"), or another appropriate structured language in this example. The handling of all requests and responses, as well as the delivery of content between the electronic client device 1002 and the application server 1008, can be handled by the Web server. It should be understood that the Web and application servers are not required and are merely example components, as structured code discussed herein can be executed on any appropriate device or host machine as discussed elsewhere herein.

The data store 1010 can include several separate data tables, databases or other data storage mechanisms and media for storing data relating to a particular aspect. For example, the data store illustrated includes mechanisms for storing production data 1012 and user information 1016, which can be used to serve content for the production side. The data store also is shown to include a mechanism for storing log data 1014, which can be used for reporting, analysis, or other such purposes. It should be understood that there could be many other aspects that may need to be stored in the data store, such as for page image information and to access right information, which can be stored in any of the above listed mechanisms as appropriate or in additional mechanisms in the data store 1010. The data store 1010 is operable, through logic associated therewith, to receive instructions from the application server 1008 and obtain, update or otherwise process data in response thereto. In one example, a user might submit a search request for a certain type of item. In this case, the data store might access the user information to verify the identity of the user and can access the catalog detail information to obtain information about items of that type. The information then can be returned to the user, such as in a results listing on a Web page that the user is able to view via a browser on the electronic client device 1002. Information for a particular item of interest can be viewed in a dedicated page or window of the browser.

Each server typically will include an operating system that provides executable program instructions for the general administration and operation of that server and typically will include a computer-readable storage medium (e.g., a hard disk, random access memory, read only memory, etc.) storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 10. Thus, the depiction of the system 1000 in FIG. 10 should be taken as being illustrative in nature and not limiting to the scope of the disclosure.

The various embodiments further can be implemented in a wide variety of operating environments, which in some cases can include one or more user computers, computing devices or processing devices which can be used to operate any of a number of applications. User or client devices can include any of a number of general purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially available operating systems and other known applications for purposes such as development and database management. These devices also can include other electronic devices, such as dummy terminals, thin-clients, gaming systems, and other devices capable of communicating via a network.

Most embodiments utilize at least one network that would be familiar to those skilled in the art for supporting communications using any of a variety of commercially-available protocols, such as Transmission Control Protocol/Internet Protocol ("TCP/IP"), Open System Interconnection ("OSI"), File Transfer Protocol ("FTP"), Universal Plug and Play ("UpnP"), Network File System ("NFS"), Common Internet File System ("CIFS"), and AppleTalk®. The network can be, for example, a local area network, a wide-area network, a virtual private network, the Internet, an intranet, an extranet, a public switched telephone network, an infrared network, a wireless network, and any combination thereof.

In embodiments utilizing a Web server, the Web server can run any of a variety of server or mid-tier applications, including Hypertext Transfer Protocol ("HTTP") servers, FTP servers, Common Gateway Interface ("CGI") servers, data servers, Java servers, and business application servers. The server(s) also may be capable of executing programs or scripts in response to requests from user devices, such as by executing one or more Web applications that may be implemented as one or more scripts or programs written in any programming language, such as Java®, C, C #, or C++, or any scripting language, such as Perl, Python, or TCL, as well as combinations thereof. The server(s) may also include database servers, including without limitation those commercially available from Oracle®, Microsoft®, Sybase®, and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit ("CPU"), at least one input device (e.g., a mouse, keyboard, controller, touch screen, or keypad), and at least one output device (e.g., a display device, printer, or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired)), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, Electrically Erasable Programmable Read-Only Memory ("EEPROM"), flash memory or other memory technology, Compact Disc Read-Only Memory ("CD-ROM"), digital versatile disk (DVD), or other optical storage, magnetic cassettes, magnetic tape, magnetic disk storage, or other magnetic storage devices, or any other medium which can be used to store the desired information and which can be accessed by a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the disclosure to the specific form or forms disclosed, but on the contrary, the intention is to cover all modifications, alternative constructions, and equivalents falling within the spirit and scope of the disclosure, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Preferred embodiments of this disclosure are described herein, including the best mode known to the inventors for carrying out the disclosure. Variations of those preferred embodiments may become apparent to those of ordinary skill in the art upon reading the foregoing description. The inventors expect skilled artisans to employ such variations as appropriate and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

What is claimed is:

1. A computer-implemented method for automatically discovering and configuring target user devices, comprising:
    receiving, by an intermediary user device from a target user device, a connection request comprising a first device identifier of the target user device and a second device identifier of an additional user device that has been detected by the target user device utilizing a short-range wireless communications protocol;
    transmitting, by the intermediary user device to a service provider computer, a verification request comprising the first device identifier of the target user device and the second device identifier of the additional user device detected by the target user device,
    the service provider computer verifying the target user device based at least on determining i) that the first device identifier of the target user device is associated with a user account managed by the service provider computer ii) that the second device identifier of the additional user device detected by the target user device matches one or more user device identifiers associated with the user account, iii) that a threshold number of additional user devices have been detected, and iv) that a confidence value is greater than a threshold confidence value indicating that the target user device is an expected device operating at an expected location, the confidence value being calculated based on at least two of: comparing a current location of the target user device to one or more locations associated with the user account, a MAC ID of the target user device, and the second device identifier;
    when verification is achieved:
    receiving, by the intermediary user device from the service provider computer, configuration information for the target user device, the configuration information comprising first authentication information associated with a network access point and second authentication information associated with the user account;
    transmitting, by the intermediary user device to the target user device, the configuration information, the target user device storing the configuration information in local memory, the target user device executing instructions to connect to the network access point utilizing the first authentication information,
    the target user device connecting to a server computer utilizing the second authentication information.

2. The computer-implemented method of claim 1, wherein the service provider computer transmits the configuration information to the intermediary user device when the second device identifier is associated with the user account.

3. The computer-implemented method of claim 1, wherein the second authentication information is transmitted in response to determining that the target user device is connected to the network access point.

4. An intermediary user device, comprising:
    a memory configured to store computer-executable instructions for automatically discovering and configuring target user devices; and
    a processor configured to access the memory and execute the computer-executable instructions to cause intermediary user device to at least:
    receive, from a target user device, a connection request comprising a first device identifier for the target user device and a second device identifier, the second device identifier corresponding to an additional user device detected by the target user device utilizing a short-range wireless communications protocol;
    transmit, to a service provider computer, a verification request comprising the first device identifier of the target user device and the second device identifier of the additional user device detected by the target user device, wherein the service provider computer verifies the target user device based at least on determining i) that the first device identifier of the target user device is associated with a user account managed by the service provider computer ii) that the second device identifier of the additional user device detected by the target user device matches one or more user device identifiers associated with the user account, iii) that a threshold number of additional user devices have been detected, and iv) that a confidence value is greater than a threshold confidence value indicating that the target user device is an expected device operating at an expected location, the confidence value being calculated based on at least two of: comparing a current location of the target user device to one or more locations associated with the user account, a MAC ID of the target user device, and the second device identifier; and when verification is achieved:
receive, by the intermediary user device from the service provider computer, configuration information for the target user device, the configuration information comprising first authentication information associated with a network access point and second authentication information associated with the user account; and
transmit the configuration information to the target user device,
the target user device storing the configuration information in local memory,
the target user device executing instructions to connect to the network access point utilizing the first authentication information,
the target user device connecting to a server computer utilizing the second authentication information.

5. The intermediary user device of claim 4, wherein one or more software applications are installed on the target user device based at least in part on transmitting the configuration information.

6. The intermediary user device of claim 4, wherein the computer-executable instructions further cause the intermediary user device to at least:
provide a network access point identifier to the target user device, wherein the target user device, in response to receiving the network access point identifier, compares the network access point identifier with a network identifier stored in local memory of the target user device, wherein the target user device transmits the first authentication information to the network access point when the network access point identifier matches the network identifier.

7. The intermediary user device of claim 4, wherein the computer-executable instructions further cause the intermediary user device to at least transmit a first network identifier associated with the network access point to the target user device, the target user device storing a second network identifier, wherein the target user device determines that the first network identifier is equal to the second network identifier prior to transmitting the connection request.

8. The intermediary user device of claim 4, wherein the computer-executable instructions further cause the intermediary user device to at least:
present a first verification code on a device other than the target user device;
receive a second verification code from the target user device; and
verify that the first verification code matches the second verification code.

9. A non-transitory computer-readable medium having stored thereon computer-executable instructions for automatically discovering and configuring target user devices that, when executed by at least one processor of an intermediary user device, cause the intermediary user device to:
receive, from a target user device, a connection request comprising a first device identifier of the target user device and a second device identifier corresponding to an additional user device detected by the target user device utilizing a short-range wireless communications protocol;
transmit, to a service provider computer, a verification request comprising at least the first device identifier of the target user device and the second device identifier of the additional user device detected by the target user device,
the service provider computer verifying the target user device based at least on determining i) that the first device identifier of the target user device is associated with a user account managed by the service provider computer ii) that the second device identifier of the additional user device detected by the target user device matches one or more user device identifiers associated with the user account, iii) that a threshold number of additional user devices have been detected, and iv) that a confidence value is greater than a threshold confidence value indicating that the target user device is an expected device operating at an expected location,
the confidence value being calculated based on at least two of: comparing a current location of the target user device to one or more locations associated with the user account, a MAC ID of the target user device, and the second device identifier; and
when verification is achieved:
receive, from the service provider computer, configuration information for the target user device, the configuration information comprising first authentication information associated with a network access point and second authentication information associated with the user account; and
transmit the configuration information to the target user device, the target user device storing the configuration information in local memory, the target user device executing instructions to connect to the network access point utilizing the first authentication information,
the target user device connecting to a server computer utilizing the second authentication information.

10. The non-transitory computer-readable medium of claim 9, wherein the intermediary user device is further configured to:
obtain verification information comprising a geographical location associated with the target user device, wherein the first authentication information or the second authentication information is transmitted to the target user device based at least in part on determining, by the intermediary user device, that the verification information matches stored verification information, the stored verification information being stored at the intermediary user device and being associated with the target user device.

11. The non-transitory computer-readable medium of claim 9, wherein
the verification request is transmitted subsequent to receiving the connection request.

12. The non-transitory computer-readable medium of claim 9, wherein the first authentication information comprises a network identifier and a network password, and wherein the second authentication information comprises a username and password associated with the user account.

13. The non-transitory computer-readable medium of claim 9, wherein the intermediary user device is further configured to:
provide an option to configure the target user device, wherein the option is provided utilizing audio capabilities of the intermediary user device; and
receive, from the target user device, an indication that the option was selected.

14. The computer-implemented method of claim 1, further comprising:
storing a third device identifier in local memory of the target user device;
obtaining, by the target user device from the intermediary user device, a fourth device identifier for the intermediary user device; and
comparing, by the target user device, the fourth device identifier obtained from the intermediary user device with the third device identifier stored in the local memory of the target user device, wherein the target user device verifies authenticity of the intermediary user device when the fourth device identifier matches the third device identifier.

15. The computer-implemented method of claim 1, wherein the service provider computer further verifies the target user device based at least in part on identifying, from the user account, a shipping status of the target user device, wherein the target user device is verified when the shipping status indicates that the target user device has been shipped.

16. The computer-implemented method of claim 1, wherein the service provider computer further verifies the target user device based at least in part on identifying, from the user account, a delivery status of the target user device, wherein the target user device is verified when the delivery status indicates that the target user device has been delivered.

* * * * *